US012711757B2

(12) United States Patent
Guo

(10) Patent No.: US 12,711,757 B2
(45) Date of Patent: Aug. 18, 2026

(54) VIDEO RECOGNITION METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventor: Hui Guo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 18/585,637

(22) Filed: Feb. 23, 2024

(65) Prior Publication Data

US 2024/0193934 A1 Jun. 13, 2024

Related U.S. Application Data

(63) Continuation of application No. PCT/CN2023/088943, filed on Apr. 18, 2023.

(30) Foreign Application Priority Data

Jun. 20, 2022 (CN) ......................... 202210695301.5

(51) Int. Cl.
*G06V 10/98* (2022.01)
*G06F 16/735* (2019.01)
(Continued)

(52) U.S. Cl.
CPC ............ *G06V 10/98* (2022.01); *G06F 16/735* (2019.01); *G06V 20/41* (2022.01); *G06V 20/46* (2022.01);
(Continued)

(58) Field of Classification Search
None
See application file for complete search history.

(56) References Cited

U.S. PATENT DOCUMENTS

2014/0044355 A1* 2/2014 Haritaoglu ............ G06F 16/785
382/170
2017/0337427 A1* 11/2017 Kansara ............... G11B 27/005
(Continued)

FOREIGN PATENT DOCUMENTS

CN 108769731 A 11/2018
CN 114550070 A 5/2022
(Continued)

OTHER PUBLICATIONS

International Search Report for PCT/CN2023/088943 dated Jun. 23, 2023.
Written Opinion for PCT/CN2023/088943 dated Jun. 23, 2023.

*Primary Examiner* — Leon Viet Q Nguyen
(74) *Attorney, Agent, or Firm* — Sughrue Mion, PLLC

(57) ABSTRACT

A video recognition method, performed by a computer device, including obtaining a target video and a series reference video in a video series, recognizing a series local similar clip in the target video relative to the series reference video according to a first matching result obtained by performing video frame matching on the target video and the series reference video, obtaining a platform reference video from a video platform to which the target video belongs, recognizing a platform global similar clip in the target video relative to the platform reference video according to a second matching result obtained by performing video frame matching on the target video and the platform reference video, and determining a comprehensive similar clip in the target video relative to the series reference video and the
(Continued)

platform reference video based on positions of the series local similar clip and the platform global similar clip.

18 Claims, 13 Drawing Sheets

(51) Int. Cl.
*G06V 20/40* (2022.01)
*G06V 20/62* (2022.01)
*G06V 10/94* (2022.01)

(52) U.S. Cl.
CPC .............. *G06V 20/48* (2022.01); *G06V 20/62* (2022.01); *G06V 10/95* (2022.01)

(56) References Cited

U.S. PATENT DOCUMENTS

2022/0036092 A1 2/2022 Farre Guiu et al.
2022/0383910 A1 * 12/2022 Wang ..................... G11B 27/34

FOREIGN PATENT DOCUMENTS

CN 114782879 A 7/2022
WO WO 2019/085941 A1 5/2019

* cited by examiner

Global library query

Queried video

Frame-level image

Frame-level feature

Fixed-period sequence similarity searching (library list)

Recognition result 1

General opening or ending library

Recommended opening or ending library

Output the recognition result 1; output the recognition result 2 in a case that the recognition result 1 is empty Queried video Frame-level image Frame-level feature Fixed-period sequence similarity searching (global list)

Recognition result 2

Global list mining

Global newly-added video

Frame-level image

Keyword query

Video information conclusion

Generate a global list

Global list generation

Comprehensive recognition result

Store a keyword into a library

Keyword 1, keyword 2...

Queried video

Frame-level image

Keyword query

Recognition result 3

Combination result

Frame-level image

Frame-level feature

Fixed-period sequence similarity searching (local list)

Recognition result 4

Local list mining

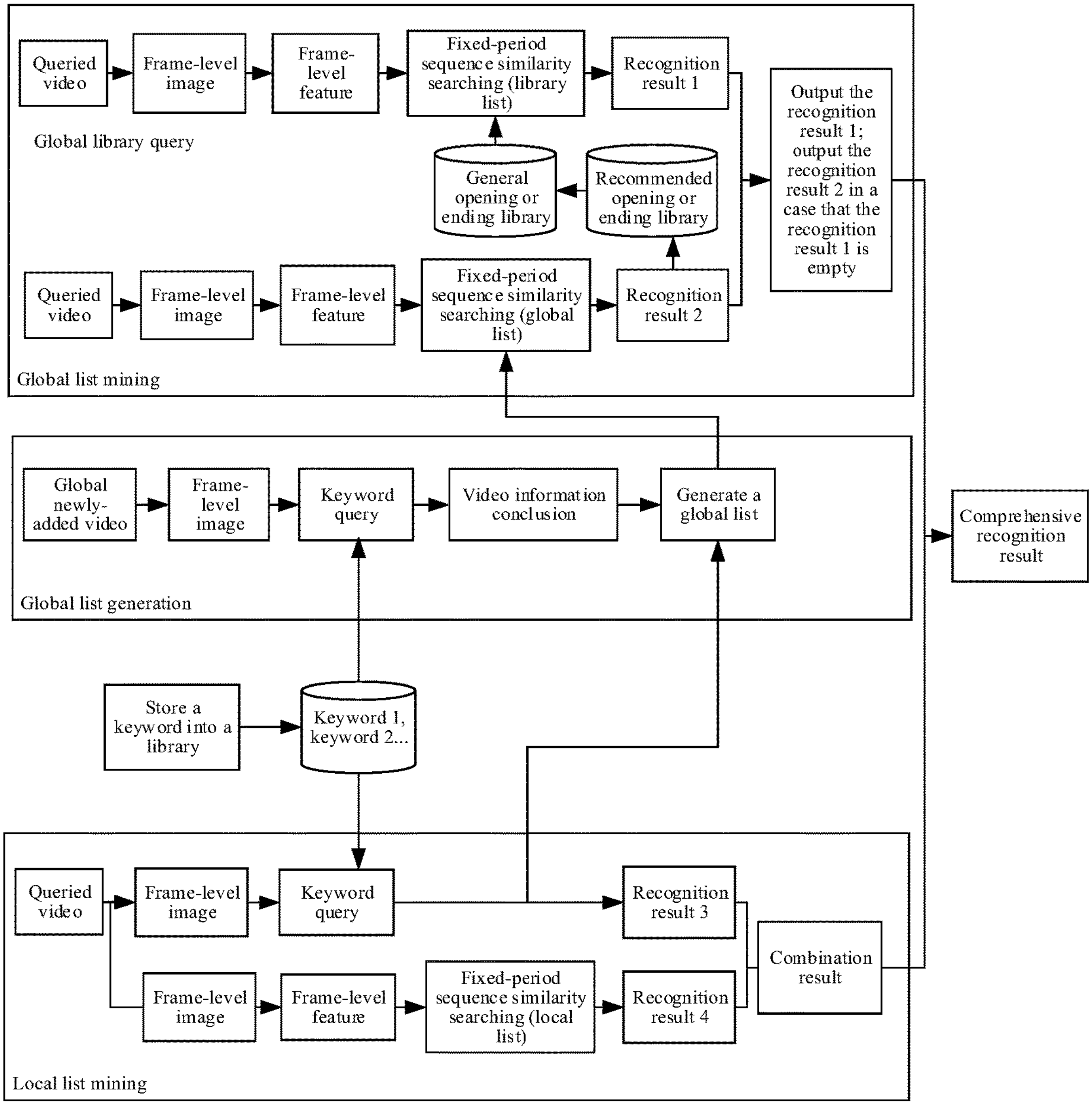

FIG. 12

Opening correction

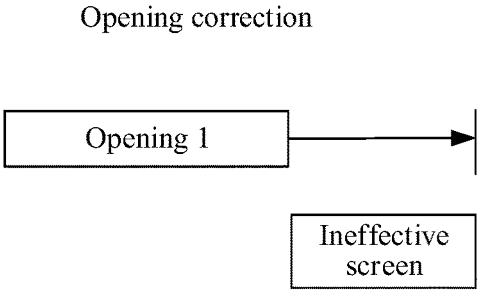

FIG. 13

VIDEO RECOGNITION METHOD AND APPARATUS, COMPUTER DEVICE, AND STORAGE MEDIUM

CROSS-REFERENCE TO RELATED APPLICATIONS

This application is a continuation application of International Application No. PCT/CN2023/088943 filed on Apr. 18, 2023, which claims priority to Chinese Patent Application No. 202210695301.5 filed with the China National Intellectual Property Administration on Jun. 20, 2022, the disclosures of each being incorporated by reference herein in their entireties.

FIELD

The disclosure relates to the field of computer technologies, and in particular, to a video recognition method and apparatus, a computer device, a storage medium, and a computer program product.

BACKGROUND

With the development of computer technologies, a variety of network video platforms have been emerging. In addition to film and television video resources on the networks, people may also create a variety of videos independently on network video platforms, including different types of videos such as series of lectures, knowledge sharing, literary classes, commentary and anecdotes, and entertainment videos to satisfy varying viewing desires of audiences. Similar video clips, such as openings, endings, and the like, are usually produced in videos on a variety of network video platforms. The video clip is not content of the video itself. During video comparison or video editing, the video clip needs to be recognized and filtered out. However, at present, the accuracy of recognition of the similar video clips is low.

SUMMARY

Some embodiments provide a video recognition method and apparatus, a computer device, a computer-readable storage medium, and a computer program product are provided.

Some embodiments provide a video recognition method, performed by a computer device, including: obtaining a target video and a series reference video in a video series, the video series comprising videos belonging to a same series; recognizing a series local similar clip in the target video relative to the series reference video according to a first matching result obtained by performing video frame matching on the target video and the series reference video; obtaining a platform reference video from a video platform to which the target video belongs; recognizing a platform global similar clip in the target video relative to the platform reference video according to a second matching result obtained by performing video frame matching on the target video and the platform reference video; and determining a comprehensive similar clip in the target video relative to the series reference video and the platform reference video based on respective positions of the series local similar clip and the platform global similar clip in the target video.

Some embodiments provide a video recognition apparatus including: at least one memory configured to store program code; and at least one processor configured to read the program code and operate as instructed by the program code, the program code comprising: first obtaining code configured to cause at least one of the at least one processor to obtain a target video and a series reference video in a video series, the video series comprising videos belonging to a same series; first recognition code configured to cause at least one of the at least one processor to recognize a series local similar clip in the target video relative to the series reference video according to a first matching result obtained by performing video frame matching on the target video and the series reference video; second obtaining code configured to cause at least one of the at least one processor to obtain a platform reference video from a video platform to which the target video belongs; second recognition code configured to cause at least one of the at least one processor to recognize a platform global similar clip in the target video relative to the platform reference video according to a second matching result obtained by performing video frame matching on the target video and the platform reference video; and determining code configured to cause at least one of the at least one processor to determine a comprehensive similar clip in the target video relative to the series reference video and the platform reference video based on respective positions of the series local similar clip and the platform global similar clip in the target.

Some embodiments provide a non-transitory computer-readable storage medium, storing computer code which, when executed by at least one processor, causes the at least one processor to at least: obtain a target video and a series reference video in a video series, the video series comprising videos belonging to a same series; recognize a series local similar clip in the target video relative to the series reference video according to a first matching result obtained by performing video frame matching on the target video and the series reference video; obtain a platform reference video from a video platform to which the target video belongs; recognize a platform global similar clip in the target video relative to the platform reference video according to a second matching result obtained by performing video frame matching on the target video and the platform reference video; and determine a comprehensive similar clip in the target video relative to the series reference video and the platform reference video based on respective positions of the series local similar clip and the platform global similar clip in the target.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone

FIG. 12 is a schematic block diagram of a method for mining an opening or an ending according to some embodiments.

FIG. 13 is a schematic diagram of processing of opening correction according to some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
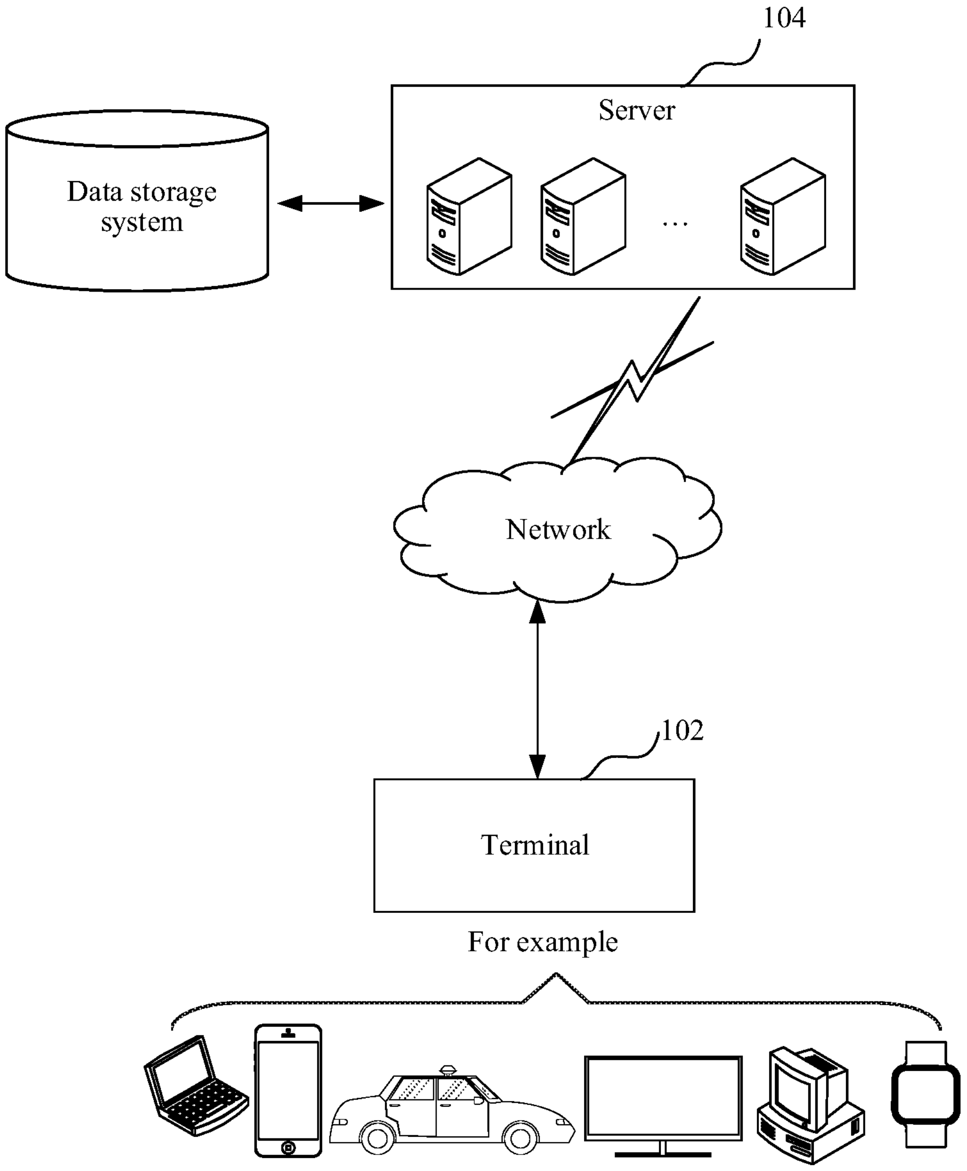
FIG. 1 is a diagram of an application environment of a video recognition method according to some embodiments.

A video recognition method provided in some embodiments may be applied to an application environment shown in FIG. 1. A terminal 102 communicates with a server 104 through a network. A data storage system may store data that the server 104 needs to process. The data storage system may be integrated on the server 104 or arranged on the cloud or another server. The server 104 may perform video frame matching on a target video in a video series and a series reference video, recognize a series local similar clip in the target video relative to the series reference video according to an obtained first matching result, perform video frame matching on a platform reference video of a video platform to which the target video belongs and the target video, recognize a platform global similar clip in the target video relative to the platform reference video according to an obtained second matching result, and determine a comprehensive similar clip in the target video based on respective positions of the series local similar clip and the platform global similar clip in the target video.

In a case that the target video is played on the terminal 102, the server 104 may send clip information of the comprehensive similar clip in the target video relative to the series reference video and the platform reference video to the terminal 102, and the terminal 102 can skip playback of the comprehensive similar clip in the target video based on the received clip information, and may skip, in a case that the comprehensive similar clip is an opening or an ending, playback of the opening or ending, to improve video playback efficiency of the terminal 102. In addition, the video recognition method provided in some embodiments may also be performed by the terminal 102 or the server 104 alone, or be performed by the terminal 102 and the server 104 together, to implement recognition on the video. The terminal 102 may be, but not limited to, various desktop computers, notebook computers, smartphones, tablet computers, Internet of Things devices, and portable wearable devices. The Internet of Things device may be an intelligent voice interaction device, a smart household appliance such as a smart television or an intelligent air conditioner, a smart in-vehicle device, an aircraft, or the like. The portable wearable device may be a smartwatch, a smart band, a head-mounted device, or the like. The server 104 may be implemented by an independent server, a server cluster including a plurality of servers, or a cloud server.

Figure 2:
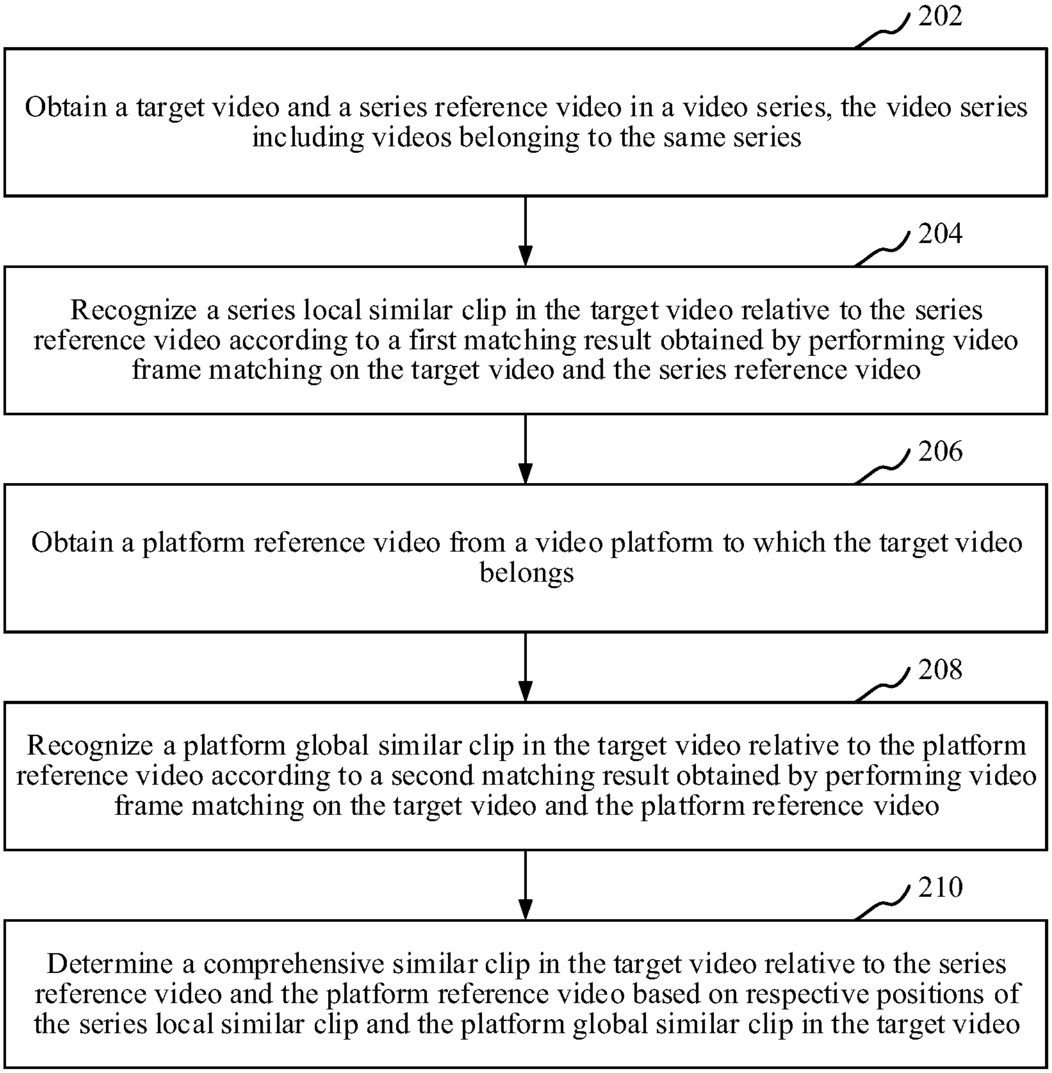
FIG. 2 is a schematic flowchart of a video recognition method according to some embodiments.

In some embodiments, as shown in FIG. 2, a video recognition method is provided. The method may be performed by an electronic device, such as a terminal or a server, alone, or may be performed by the terminal and the server together. In some embodiments, descriptions are provided by using an example in which the method is applied to the server in FIG. 1. The method includes following operations:

Operation 202: Obtain a target video and a series reference video in a video series. The video series includes videos belonging to the same series.

The video series refers to a set including a plurality of videos belonging to the same series. For belonging to the same series, division may be performed based on actual needs according to different series division dimensions. For example, the same TV series may be considered as belonging to the same series, and the TV series includes a set formed by TV videos, that is, a video series of the TV series. For another example, videos created by the same creator may be considered as belonging to the same series, and a set formed by videos created by the creator may be used as a video series, and durations of the videos may be different. In addition, the same series may also be videos on the same topic, videos produced at the same production location, and the like. The video series includes a plurality of videos, and the plurality of videos may have similar clips. For example, for videos created by the same creator, an opening that introduces the creator may exist at a beginning of each video, an ending that summarizes the video may also exist, and so on. An opening of a video is generally used to prompt a beginning of the video, and an ending of the video is used to prompt an end of the video. There are many forms of openings and endings, which may include, but not limited to, audio and video materials, text, logos, and the like.

The target video is a video on which recognition needs to be performed in the video series. That is, a video clip similar to another video needs to be recognized from the target video. For example, an opening and an ending may be recognized and the opening and the ending are video clips similar to other videos. The reference video is used as a reference for recognition on the target video. That is, a similar video clip in the target video is recognized based on the reference video. The series reference video is a reference video obtained by sampling and performing extraction on the video series. Both the series reference video and the target video belong to the same video series. There may be similar video clips between videos belonging to the same video series and may be skipped during playback, or a main part of a video may be accurately edited. A quantity of series reference videos may be set according to actual needs. For example, the quantity of series reference videos may be set to a fixed quantity or may be set according to a duration of the target video and a quantity of videos included in the video series. For example, the longer the duration of the target video, the larger the quantity of series reference videos that may be set. The larger the quantity of videos included in the video series, the larger the quantity of series reference videos that may be set. Alternatively, the quantity of series reference videos may be set to a fixed proportion of the quantity of videos included in the video series, for example, may be set to 50%. Therefore, in a case that the quantity of videos included in the video series is 20, the quantity of series reference videos may be 10. That is, in addition to the target video, 10 videos are extracted from the video series as the series reference videos.

In some embodiments, in a case that a video recognition event is triggered, indicating that video recognition needs to be performed, the server obtains a target video and a series reference video from a video series. In some embodiments, the server may determine the video series targeted by the video recognition event, the server queries the video series and determine the target video from the video series, and the server extracts the series reference video from the video series, to obtain the target video and the series reference video that belong to the same video series. In addition, after determining the target video, the server may determine the video series divided for the target video, to obtain the target video and the series reference video from the video series.

Operation 204: Recognize a series local similar clip in the target video relative to the series reference video according to a first matching result obtained by performing video frame matching on the target video and the series reference video.

A video frame refers to each image frame in a video. The video is obtained by combining a plurality of video frames. That is, the video includes a plurality of video frames, and each video frame is an image. The video frame matching refers to performing image matching processing on video frames belonging to different videos, to determine matching video frames that exist in the different videos. For example, existence of video frames that match each other in similarity or existence of video frames that match each other in image content is determined. For example, a first video frame extracted from a first video may be image-matched with a second video frame extracted from a second video, to determine, from the first video, a video frame matching a video frame in the second video. The first video frame and the second video frame, for example, may be video frames that include same image content, for example, both include opening content or ending content. The first matching result is an image matching result obtained by performing video frame matching on the target video and the series reference video. The first matching result may in some embodiments include matching video frames recognized from the target video and the series reference video. For the video frame matching processing on the target video and the series reference video, a video frame in the target video may be matched with a video frame in the series reference video in similarity, and a first matching result including matching video frames between the target video and the series reference video is obtained according to the video frames corresponding to a similarity that satisfies a similarity threshold.

Similar clips refer to video clips with similar screens between different videos. The series local similar clip refers to a video clip in the target video that is similar to a clip in the series reference video. In a case that the series local similar clip in the target video is similar to a clip in the reference video, then the series local similar clip may be repeated video content between the target video and the series reference video, for example, may be video content that is reused by the target video and the series reference video, and in some embodiments, may be reused video content such as an opening, an ending, an advertisement, and platform introduction information.

In some embodiments, the server perform recognition on the target video and the series reference video, to recognize similar video clips existing in the target video and the series reference video. The server performs video frame matching on the target video and the series reference video. In some embodiments, the server may extract video frames from the target video and the series reference video respectively, and perform image matching on the extracted video frames, for example, perform image similarity matching, to obtain a first matching result. Based on the first matching result, the server recognizes a series local similar clip in the target video relative to the series reference video. In some embodiments, the server may determine the series local similar clip according to time attributes of the matching video frames in the target video and the series reference video, for example, a timestamp position of the matching frames in the target video. The series local similar clip is obtained by performing recognition on the target video through the series reference video in the video series to which the target video belongs, and is a similar clip obtained based on partial video recognition compared with all videos on the entire video platform.

For example, in the obtained first matching result, in a case that a video frame at the $1^{st}$ second in the target video matches a video frame at the $3^{rd}$ second in the series reference video, a video frame at the $2^{nd}$ second in the target video matches a video frame at $4^{th}$ second in the series reference video, a video frame of the $3^{rd}$ second in the target video matches a video frame of the $5^{th}$ second in the series reference video, and a video frame of the $4^{th}$ second in the target video matches a video frame of the $6^{th}$ second in the series reference video, the server may determine that a video clip from the $1^{st}$ second to the $4^{th}$ second in the target video is the series local similar clip relative to the series reference video, so that the series local similar clip is recognized.

Operation 206: Obtain a platform reference video from a video platform to which the target video belongs.

The video platform refers to a platform that can provide video resources. Users can perform operations, such as video playback, video viewing, video downloading, and video collection, on the video platform. In some embodiments, video creators may publish created videos onto the video platform for video viewers to watch. The platform reference video comes from the video platform to which the target video belongs, that is, belongs to the same video platform as the target video belongs to, and in some embodiments, may be a video extracted from the video platform to which the target video belongs as a reference video for performing recognition on the target video.

In some embodiments, the server obtains the platform reference video. According to some embodiments, the server may determine the video platform to which the target video belongs, and obtain the platform reference video belonging to the video platform. In some embodiments, the platform reference video may be an original platform video obtained directly from the video platform, that is, a platform video without being further processed. The platform reference video may alternatively be a video obtained after an original platform video is edited, for example, may be a video clip clipped from the original platform video.

Operation 208: Recognize a platform global similar clip in the target video relative to the platform reference video according to a second matching result obtained by performing video frame matching on the target video and the platform reference video.

The second matching result is an image matching result obtained by performing video frame matching on the target video and the platform reference video. The second matching result may in some embodiments include matching video frames recognized from the target video and the platform reference video, for example, include video frames that match each other in similarity, video frames that match each other in image content, or the like. The video frame matching on the target video and the platform reference video may be performed by using the same processing method as the video frame matching on the target video and the series reference video. The platform global similar clip refers to a video clip in the target video that is similar to a clip in the platform reference video.

In some embodiments, the server perform recognition on the target video and the platform reference video, to recognize similar video clips existing in the target video and the platform reference video. The server performs video frame matching on the target video and the platform reference video. In some embodiments, the server may extract video frames from the target video and the platform reference video respectively, and perform image matching on the extracted video frames, to obtain a second matching result. Based on the second matching result, the server recognizes the platform global similar clip in the target video relative to the platform reference video. The platform global similar clip is obtained by performing recognition on the target video through the platform reference video on the video platform to which the target video belongs, and is a similar clip obtained based on global video recognition performed on all videos on the entire video platform.

Operation 210: Determine a comprehensive similar clip in the target video relative to the series reference video and the platform reference video based on respective positions of the series local similar clip and the platform global similar clip in the target video.

Respective positions of the series local similar clip and the platform global similar clip in the target video refer to respective timestamp positions of the series local similar clip and the platform global similar clip in the target video. For example, in a case that the series local similar clip is a video clip from the $2^{nd}$ second to the $6^{th}$ second, a position of the series local similar clip in the target video may be a timestamp position from the $2^{nd}$ second to the $6^{th}$ second. In a case that the platform global similar clip is a video clip from the $3^{rd}$ second to the $8^{th}$ second, a position of the platform global similar clip in the target video may be a timestamp position from the $3^{rd}$ second to the $8^{th}$ second. The comprehensive similar clip is a video recognition result obtained by integrating the series local similar clip and the platform global similar clip.

In some embodiments, the server determines respective positions of the series local similar clip and the platform global similar clip in the target video, and determines a comprehensive similar clip in the target video relative to the series reference video and the platform reference video based on the positions. For example, in a case that a position of the series local similar clip is from the $2^{nd}$ second to the $6^{th}$ second, and a position of the platform global similar clip is from the $3^{rd}$ second to the $8^{th}$ second, the server can combine the positions of the two and determine that a video clip corresponding to a position from the $2^{nd}$ to the $8^{th}$ second is a comprehensive similar clip in the target video. In addition, alternatively, a user may actively adjust the comprehensive similar clip to obtain a more accurate comprehensive similar clip.

During specific application, after determining the comprehensive similar clip in the target video relative to the series reference video and the platform reference video, where the comprehensive similar clip may be a video clip reused in the target video, for example, may be video content such as an opening, an ending, an advertisement, or platform information, during playback of the target video, playback of the comprehensive similar clip may be skipped, thereby improving the playback efficiency. In addition, in an application scenario of video comparison, in a case that there is an opening, an ending, or advertisement content that is reused in videos of the video series, and there is no need to perform comparison, the comprehensive similar clip may be cut off from the target video, so that video comparison is performed on other video clips in the target video, which helps reduce an amount of data processed for video comparison and improves the processing efficiency of video comparison.

In the foregoing video recognition method, video frame matching is performed on a target video in a video series and a series reference video, a series local similar clip in the target video relative to the series reference video is recognized according to an obtained first matching result, video frame matching is performed on a platform reference video of a video platform to which the target video belongs and the target video, a platform global similar clip in the target video relative to the platform reference video is recognized according to an obtained second matching result, and a comprehensive similar clip in the target video is determined based on respective positions of the series local similar clip and the platform global similar clip in the target video. The series local similar clip is recognized based on the series reference video belonging to the same video series as the target video belongs to. The platform global similar clip is recognized based on the platform reference video belonging to the same video platform as the target video belongs to. The comprehensive similar clip obtained based on respective positions of the series local similar clip and the platform global similar clip in the target video and integrates video similar characteristics in the video series and video similar characteristics on the video platform, which improves the accuracy of recognizing a similar video clip in a video.

In some embodiments, the video recognition method further includes: correcting and updating the series local similar clip according to a correction clip including a correction keyword in the target video, to obtain an updated series local similar clip.

The correction keyword is a keyword configured for correcting video recognition on the target video, to improve the accuracy of video recognition. The correction keyword may be, in some embodiments, different types of keywords such as a keyword of platform introduction information, an advertisement keyword, and a video introduction keyword. For example, in a case that content displayed in a video clip from the $2^{nd}$ second to the $4^{th}$ second in a video A is a video introduction keyword, "Episode N" or "purely fictitious", it may be considered that the video clip is not main video content in the target video and is a similar clip. For another example, in a case that content displayed in a video clip from the $1^{st}$ second to the $2.5^{th}$ second in a video B is platform introduction information, "XXX video platform", it may be considered that the video clip is not main video content in the target video and is a similar clip reused by videos on a video platform. The correction clip is a video clip in the target video required for correcting video recognition, and in some embodiments, may be a video clip including a correction keyword in the target video. As in the foregoing video B, in a case that the video clip from the $1^{st}$ second to the $2.5^{th}$ second includes the correction keyword, "XXX video platform", it can be determined that the video clip from the $1^{st}$ second to the $2.5^{th}$ second in the video B is a correction clip.

In some embodiments, the server determines a correction clip including the correction keyword in the target video. During application, the server may perform text recognition on video frames in the target video, to recognize, in the video frames of the target video, the correction clip including the correction keyword. The correction keyword can be preset according to actual needs, for example, may include different types of keywords such as a keyword of platform introduction information, an advertisement keyword, and a video introduction keyword. The server corrects and updates the series local similar clip based on the correction clip in the target video, and in some embodiments, may correct and update a position of the series local similar clip in the target video by using a distribution of the correction clip in the target video, for example, a position of the correction clip in the target video, to obtain an updated series local similar clip based on an updated position of the series local similar clip in the target video. In a case that the correction clip includes the correction keyword, it is considered that the correction clip is also a similar clip reused by videos and needs to be used as a video recognition result. For example, in a case that a series local similar clip of a video C is a video clip from the $2^{nd}$ second to the $5^{th}$ second, and a correction clip including a correction keyword in the video C is from the $0^{th}$ second to the $2^{nd}$ second, the server may determine that an updated series local similar clip is a video clip from the $0^{th}$ second to the $5^{th}$ second, to correct and update the series local similar clip based on the correction clip, which improves the accuracy of video recognition.

Further, the determining a comprehensive similar clip in the target video relative to the series reference video and the platform reference video based on respective positions of the series local similar clip and the platform global similar clip in the target video includes determining the comprehensive similar clip in the target video relative to the series reference video and the platform reference video based on a position of the updated series local similar clip and the position of the platform global similar clip in the target video.

In some embodiments, the server determines the comprehensive similar clip through the updated series local similar clip and the platform global similar clip. During application, the server may determine a position of the updated series local similar clip and the position of the platform global similar clip in the target video, and determines the comprehensive similar clip in the target video relative to the series reference video and the platform reference video based on the positions.

In some embodiments, the series local similar clip is corrected and updated through the correction clip including the correction keyword in the target video, and the comprehensive similar clip is determined based on the updated series local similar clip and the platform global similar clip. The series local similar clip may be corrected and updated by using the correction keyword, and a video clip reusing the correction keyword may be recognized, which improves the accuracy of recognizing a similar video clip in a video.

In some embodiments, the correcting and updating the series local similar clip according to a correction clip including a correction keyword in the target video, to obtain an updated series local similar clip, includes: determining the correction clip including the correction keyword in the target video; updating a timestamp position of the series local similar clip in the target video according to a timestamp position of the correction clip in the target video, to obtain an updated timestamp position; and determining the updated series local similar clip in the target video based on the updated timestamp position.

The timestamp position refers to a position of a timestamp of a video clip in a video to which the video clip belongs. For example, for a video with a duration of 2 minutes, a timestamp is from 00:00 to 02:00. In a case that a video clip in the video is a clip from the $23^{rd}$ second to the $59^{th}$ second, a timestamp position of the video clip in the video is from 00:23 to 00:59. Different video clips in a video have different timestamp positions, the corresponding video clips may be determined from the video according to the timestamp positions.

In some embodiments, the server determines a correction clip including the correction keyword in the target video. For example, the server may perform text recognition on video frames in the target video, to determine the correction clip including the correction keyword in the target video. The server determines a timestamp position of the correction clip in the target video and a timestamp position of the series local similar clip in the target video. The server updates a timestamp position of the series local similar clip in the target video, to obtain an updated timestamp position, and determines the updated series local similar clip in the target video based on the updated timestamp position.

For example, in a case that the server determines that the correction clip including the correction keyword in the target video is a video clip from the $30^{th}$ second to the $31^{st}$ second, the server may determine that a timestamp position of the correction clip is from 00:30 to 00:31. In a case that a timestamp position of the series local similar clip in the target video is from 00:26 to 00:30, the server may obtain an updated timestamp position of from 00:26 to 00:31. That is, the updated series local similar clip in the target video is a video clip from the 26th second to the 31st second.

In some embodiments, the timestamp position of the series local similar clip in the target video is updated based on the timestamp position of the correction clip in the target video, and the updated series local similar clip in the target video is determined based on the updated timestamp position, so that the series local similar clip may be accurately corrected and updated based on the timestamp position, to ensure the accuracy of the series local similar clip, which helps improve the accuracy of recognizing a similar video clip in a video.

In some embodiments, the determining the correction clip including the correction keyword in the target video includes: performing text recognition on video frames in the target video, to obtain text recognition results; matching the text recognition results with the correction keyword, to obtain matching results; and determining the correction clip including the correction keyword in the target video according to video frames associated with matching results indicating a successful match.

The correction keyword may be preset according to actual needs. For example, a keyword library may be constructed, different types of correction keywords are stored in the keyword library, and the text recognition results of the target video are matched with the different types of correction keywords in the keyword library, to determine whether the target video includes a correction clip carrying a correction keyword.

In some embodiments, the server obtains the video frames from the target video, for example, may extract a plurality of video frames at equal intervals. The server performs text recognition on the obtained video frames respectively to obtain the text recognition results. The server obtains a preset correction keyword, and matches the text recognition results of the target video with the correction keyword, to obtain the matching results. The server sifts matching results indicating a successful match, determines video frames associated with the matching results indicating a successful match, and determines the correction clip including the correction keyword in the target video based on the video frames. For example, for the first 10 seconds of the target video, one video frame is extracted every 0.5 seconds, to obtain 20 video frames. The server performs text recognition on the video frames respectively, and matches text recognition results of all the video frames with the correction keyword. In a case that video frames associated with matching results indicating a successful match are the 18th to 20th video frames, the server may determine that the correction clip in the target video is a video clip between the 18th video frame and the 20th video frame, and in some embodiments, a video clip from the 9th second to the 10th second in the target video.

In some embodiments, by performing text recognition on the video frames in the target video, the matching results are obtained by matching the text recognition results with the correction keyword, to determine the correction clip including the correction keyword in the target video. The correction clip in the target video may be accurately recognized using a text search method, and further, the series local similar clip is corrected and updated based on the correction clip, which improves the accuracy of video recognition.

Figure 3:
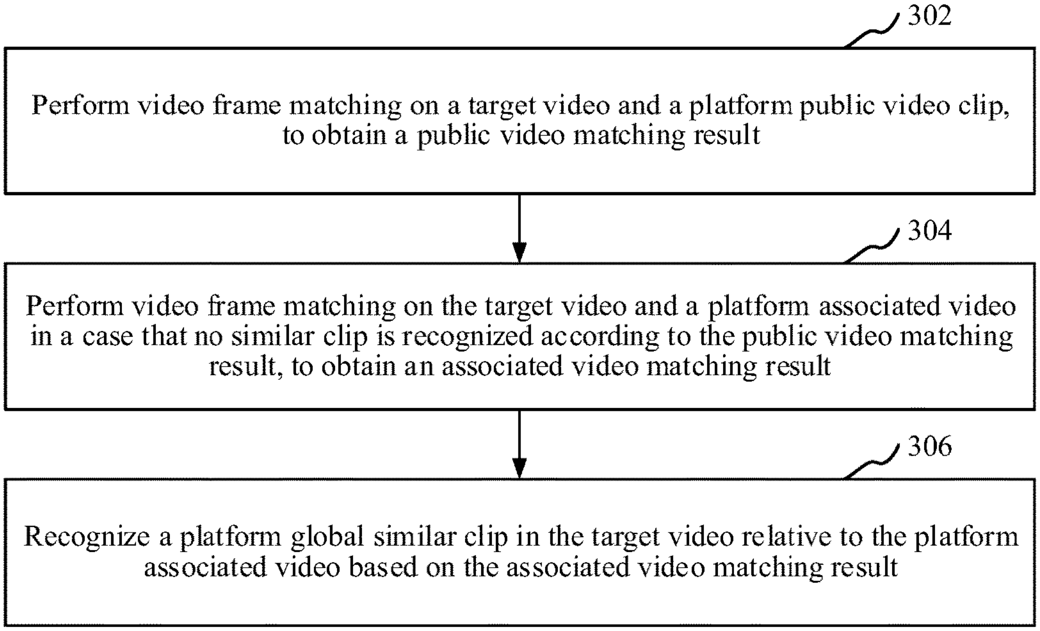
FIG. 3 is a schematic flowchart of performing recognition on a platform global similar clip according to some embodiments.

In some embodiments, the platform reference video includes a platform public video clip obtained from a public video library of the video platform to which the target video belongs and a platform associated video obtained from the video platform. As shown in FIG. 3, the recognition on the platform global similar clip, that is, the recognizing a platform global similar clip in the target video relative to the platform reference video according to a second matching result obtained by performing video frame matching on the target video and the platform reference video, includes the following operations:

Operation 302: Perform video frame matching on the target video and the platform public video clip, to obtain a public video matching result.

A public video library is associated with the video platform and is configured to store each platform public video clip on the video platform. The platform public video clip is a public video clip shared by videos on the video platform. For example, with regard to a video platform A, for all videos uploaded to the video platform A, the video platform A adds a video clip introducing the video platform A to the uploaded videos, to indicate a source of the videos. In this case, for all the videos on the video platform share the video clip introducing the video platform A. This video clip is the platform public video clip. There may be one or more platform public video clips, and a duration and content of the platform public video clip may also be set by the video platform according to actual needs. The platform public video clip is carried in all videos on the video platform. The platform public video clip does not belong to main content of a video, but is a similar video clip. In a case that the main content of the video is edited or video comparison is performed, the platform public video clip may be recognized and deleted.

The platform associated video is a video obtained from the video platform to which the target video belongs and in some embodiments is a video sampled from the video platform. A method for obtaining the platform associated video may be set according to actual needs. For example, the platform associated video may be extracted from the video platform through random sampling. Alternatively, a sifting condition, such as a release time, topic content, or a keyword, may be set, to sift the platform associated video from the videos on the video platform. The public video matching result is a matching result obtained by performing video frame matching on the target video and the platform public video clip.

In some embodiments, the platform reference video obtained by the server includes the platform public video clip obtained from the public video library of the video platform to which the target video belongs. For example, the server may determine the video platform to which the target video belongs, queries the public video library of the video platform, and obtains the platform public video clip from the public video library. The server performs video frame matching on the target video and the platform public video clip, to obtain a public video matching result.

Operation 304: Perform video frame matching on the target video and the platform associated video in a case that no similar clip is recognized according to the public video matching result, to obtain an associated video matching result.

The associated video matching result is a matching result obtained by performing video frame matching on the target video and the platform associated video. The associated video matching result may include matching video frames recognized from the target video and the platform associated video.

In some embodiments, the server recognizes a similar clip in the target video based on the public video matching result. In a case that no similar clip is recognized, indicating that there is no video clip that is in common with the platform public video clip in the target video, the server performs video frame matching on the target video and the platform associated video, to obtain the associated video matching result.

Operation 306: Recognize the platform global similar clip in the target video relative to the platform associated video based on the associated video matching result.

In some embodiments, the server recognizes the platform global similar clip in the target video relative to the platform associated video based on the associated video matching result. For example, the server may determine successfully matched video frames in the target video based on the associated video matching result, and recognizes the platform global similar clip in the target video relative to the platform associated video based on a timestamp position of the video frames.

In some embodiments, the platform reference video includes the platform public video clip obtained from the public video library of the video platform to which the target video belongs and the platform associated video obtained from the video platform. The server first performs recognition on the target video based on the platform public video clip, and performs recognition on the target video based on the platform associated video in a case that no similar clip is recognized, to obtain the platform global similar clip in the target video relative to the platform associated video. First performing recognition based on the platform public video clip can improve the pertinence of similar clip recognition, which reduces an amount of data for similar clip recognition, and helps improve the processing efficiency of similar clip recognition. Moreover, in a case that no similar clip is recognized based on the platform public video clip, performing recognition based on the platform associated video can ensure the accuracy of similar clip recognition.

In some embodiments, after the recognizing the platform global similar clip in the target video relative to the platform associated video based on the associated video matching result, the video recognition method further includes: updating a recognition statistical parameter of the platform global similar clip, to obtain an updated recognition statistical parameter; and updating the platform global similar clip as the platform public video clip into the public video library in a case that the updated recognition statistical parameter satisfies a platform public determination condition.

The recognition statistical parameter is a parameter obtained by collecting statistics of the recognition on the platform global similar clip. A parameter type of the recognition statistical parameter may be set according to actual needs. For example, the recognition statistical parameter may include a quantity of times, a frequency, or the like of successfully recognizing the platform global similar clip. For all recognized platform global similar clips, statistics of the recognition on the platform global similar clips may be collected, to obtain the recognition statistical parameter. The platform public determination condition is a determination condition for determining whether a platform global similar clip is used as a platform public video clip, for example, may be that a recognition statistical parameter exceeds a preset parameter threshold, which may be, in some embodiments, that a quantity of times exceeds a quantity of times threshold, a frequency is greater than a frequency threshold, and so on.

In some embodiments, after recognizing the platform global similar clip in the target video relative to the platform associated video, the server may query for the recognition statistical parameter of the platform global similar clip. The recognition statistical parameter reflects a statistical result of successfully recognizing the platform global similar clip. The server updates the recognition statistical parameter of the platform global similar clip. For example, in a case that the recognition statistical parameter of the platform global similar clip includes a quantity of recognition successes, which is, in some embodiments, 5, the server may increase the quantity of times by 1 and update the quantity of times in the recognition statistical parameter to 6. The server queries for the preset platform public determination condition. The server compares the updated recognition statistical parameter with the platform public determination condition. In a case that the updated recognition statistical parameter satisfies the platform public determination condition, the server may use the platform global similar clip as the platform public video clip and update the platform global similar clip into the public video library, to dynamically update the public video library. In the subsequent video recognition, the server may use the platform global similar clip as the platform public video clip to perform video recognition first.

In some embodiments, after the platform global similar clip is successfully recognized, the server updates the recognition statistical parameter of the platform global similar clip. In a case that the updated recognition statistical parameter satisfies the platform public determination condition, the server may update the platform global similar clip as the platform public video clip into the public video library, thereby dynamically updating the public video library, which can ensure timeliness of the platform public video clip in the public video library, and help improve the accuracy and processing efficiency of video similar clip recognition.

In some embodiments, the obtaining a platform reference video from a video platform to which the target video belongs includes: obtaining the platform public video clip from a public video library of the video platform to which the target video belongs.

A public video library is associated with the video platform and is configured to store each platform public video clip on the video platform. The platform public video clip is a public video clip shared by videos on the video platform. In some embodiments, the platform reference video obtained by the server includes the platform public video clip obtained from the public video library of the video platform to which the target video belongs. For example, the server may determine the video platform to which the target video belongs, queries the public video library of the video platform, and obtains the platform public video clip from the public video library. During specific application, the server may obtain all the platform public video clips in the public video library, and may also perform sifting in the public video library, for example, according to a release time, a video topic, or the like, to obtain a platform public video clip satisfying the sifting condition.

Further, the recognizing a platform global similar clip in the target video relative to the platform reference video according to a second matching result obtained by performing video frame matching on the target video and the platform reference video includes: recognizing the platform global similar clip in the target video relative to the platform public video clip according to the second matching result obtained by performing video frame matching on the target video and the platform public video clip.

In some embodiments, the server performs video frame matching on the target video and platform public video clip, to obtain a second matching result. The second matching result may include matching video frames recognized from the target video and the platform public video clip. The server recognizes the platform global similar clip in the target video relative to the platform public video clip based on the second matching result, for example, may determine the platform global similar clip in the target video according to respective positions of the recognized matching video frames in the target video.

In some embodiments, the platform reference video includes the platform public video clip obtained from the public video library of the video platform to which the target video belongs. The server performs recognition based on the platform public video clip, which can improve the pertinence of similar clip recognition, reduce an amount of data for similar clip recognition, and help improve the processing efficiency of similar clip recognition.

In some embodiments, the obtaining a platform reference video from a video platform to which the target video belongs includes: determining the video platform to which the target video belongs and a correction keyword included in video frames of the target video; querying the video platform for platform associated videos having association relationships with the correction keyword; and sifting a platform reference video from the platform associated videos according to a reference video sifting condition.

The platform associated video is a video that is obtained from the video platform to which the target video belongs and that has an association relationship with the correction keyword. Association relationships between videos on the video platform and the correction keyword may be established in advance. For example, in a case that a video is uploaded to the video platform, text recognition is performed on video frames of the video, a correction keyword included in the video is determined based on text recognition results, and an association relationship between the video and the correction keyword is established. The reference video sifting condition is a preset sifting condition for sifting a platform reference video from platform associated videos and for example, may be various sifting conditions such as a release time and a video topic.

In some embodiments, the server determines the video platform to which the target video belongs. In some embodiments, the server may query for video attribute information of the target video, and determine, based on the video attribute information, the video platform to which the target video belongs. The server determines a correction keyword included in video frames of the target video. In some embodiments, the server may perform text recognition on the video frames of the target video, and determine, based on text recognition results, the correction keyword included in the video frames of the target video. The server queries the video platform for platform associated videos having association relationships with the correction keyword. For example, the server may obtain through query, based on association relationships between videos on the video platform and keywords, the platform associated videos having the association relationships with the correction keyword. The server queries for a preset reference video sifting condition such as a sifting condition of a release time. The server performs sifting on the platform associated videos based on the reference video sifting condition, to obtain, from the platform associated videos, a platform reference video satisfying the reference video sifting condition. For example, in a case that a release time of the target video is Jun. 1, 2022, and the reference video sifting condition may be that a release time is within one month before the release time of the target video, the server sifts, from the platform associated videos, a platform reference video whose release time is between May 1, 2022 and Jun. 1, 2022.

In some embodiments, the platform reference video includes a platform associated video that has association relationship with the correction keyword, that is obtained from the video platform, and that is sifted through the reference video sifting condition, so that global video recognition can be performed by using various videos on the video platform, and a quantity of platform reference videos is controlled, to reduce an overall amount of data in performing similar clip recognition using the platform reference videos, which can improve the processing efficiency of similar clip recognition while ensuring the accuracy of similar clip recognition.

In some embodiments, the video recognition method further includes: performing text recognition on video frames in a platform video belonging to the video platform, to obtain a video keyword; performing matching in a keyword library based on the video keyword, to determine a target keyword matching the video keyword; establishing an association relationship between the platform video and the target keyword.

The platform video refers to each video belonging to the video platform, and the video keyword is a keyword obtained by performing text recognition on the platform video. The keyword library stores various keywords, and the target keyword is a keyword that is in the keyword library and that matches the video keyword. In some embodiments, the server may perform text recognition on the platform video belonging to the video platform, for example, perform text recognition on the video frames in the platform video, to obtain the video keyword included in the video frames of the platform video. The server queries the keyword library. The keyword library may store various correction keywords. The keyword library may be preset and dynamically updated and maintained according to actual needs. The server performs matching on the video keyword in the keyword library, determines a target keyword matching the video keyword, and establishes an association relationship between the platform video and the target keyword, so that a corresponding platform video can be queried based on the keyword and association relationship.

Further, the querying the video platform for platform associated videos having association relationships with the correction keyword includes: querying, based on the association relationships, the video platform for the platform associated videos associated with the correction keyword.

In some embodiments, for platform videos on the video platform, the server determines their association relationships, and obtains through query, based on the association relationships and the correction keyword, platform associated videos associated with the correction keyword.

In some embodiments, for the platform videos on the video platform, association relationships between the platform videos and the keyword are established, and the platform associated videos associated with the correction keyword on the video platform are determined based on the association relationships, which can improve the accuracy and processing efficiency of querying for the platform associated videos and help improve the accuracy and processing efficiency of similar clip recognition.

In some embodiments, the determining a comprehensive similar clip in the target video relative to the series reference video and the platform reference video based on respective positions of the series local similar clip and the platform global similar clip in the target video includes: determining a first timestamp position of the series local similar clip in the target video and a second timestamp position of the platform global similar clip in the target video; combining the first timestamp position with the second timestamp position, to obtain a comprehensive timestamp position; and determining the comprehensive similar clip in the target video relative to the series reference video and the platform reference video according to the comprehensive timestamp position.

The first timestamp position refers to a timestamp position of the series local similar clip in the target video, and the second timestamp position is a timestamp position of the platform global similar clip in the target video. The comprehensive timestamp position is a timestamp position obtained by combining the first timestamp position and the second timestamp position. The comprehensive similar clip may be determined from the target video according to the comprehensive timestamp position.

In some embodiments, the server determines the first timestamp position of the series local similar clip in the target video and the second timestamp position of the platform global similar clip in the target video. In some embodiments, the server determines the respective timestamp positions of the series local similar clip and the platform global similar clip in the target video. The server combines the first timestamp position with the second timestamp position, to obtain a comprehensive timestamp position. According to some embodiments, the server may directly combine the first timestamp position and the second timestamp position, to obtain a comprehensive timestamp position. For example, in a case that the first timestamp position is from 00:05 to 00:15, and the second timestamp position is from 00:02 to 00:06, the server may directly combine the first timestamp position and the second timestamp position, to obtain a comprehensive timestamp position that is from 00:02 to 00:15. In addition, the server may further perform partial combine according to actual needs, to obtain a comprehensive timestamp position. For example, in a case that the first timestamp position is from 00:05 to 00:15, and the second timestamp position is from 00:04 to 00:14, the server may obtain a comprehensive timestamp position that is from 00:05 to 00:14 according to a position at which the first timestamp position overlaps with the second timestamp position. The server determines a comprehensive similar clip in the target video relative to the series reference video and the platform reference video according to the obtained comprehensive timestamp position. For example, in a case that the comprehensive timestamp position is from 00:02 to 00:15, the server may determine a video clip from the $2^{nd}$ second to the $15^{th}$ second in the target video as a comprehensive similar clip relative to the series reference video and the platform reference video.

In some embodiments, the first timestamp position of the series local similar clip in the target video and the second timestamp position of the platform global similar clip in the target video are combined, and the comprehensive similar clip in the target video relative to the series reference video and the platform reference video is determined according to the comprehensive timestamp position, so that comprehensive processing is implemented on the series local similar clip and the platform global similar clip based on the timestamp positions. In this way, the comprehensive similar clip integrates video similar characteristics in the video series and video similar characteristics on the video platform, which improves the accuracy of recognizing a similar video clip in a video.

In some embodiments, the recognizing a series local similar clip in the target video relative to the series reference video according to a first matching result obtained by performing video frame matching on the target video and the series reference video includes: performing image matching on video frames of the target video and the series reference video, to obtain video frame pairs, the video frame pairs including to-be-recognized video frames belonging to the target video and further including series reference video frames image-matching the to-be-recognized video frames in the series reference video; determining time offsets of the video frame pairs based on time attributes of the to-be-recognized video frames in the video frame pairs and time attributes of the series reference video frames in the video frame pairs; and sifting video frame pairs with matching time offsets, and determining the series local similar clip in the target video relative to the series reference video based on time attributes of to-be-recognized video frames in the sifted video frame pairs.

The video frame pairs are image pairs formed by successfully matched video frames determined by performing image matching on video frames of the target video and the reference video. In a case that the reference video is a series reference video, the video frame pairs include to-be-recognized video frames belonging to the target video, and series reference video frames image-matching the to-be-recognized video frames in the series reference video. That is, the to-be-recognized video frames and the series reference video frames in the video frame pairs are obtained through successful image matching. The to-be-recognized video frames in the video frame pairs come from the target video, and the series reference video frames come from the series reference video.

The time attribute is configured to describe time information of a corresponding video frame, and can represent a position of the video frame in a video. The time attribute may be, in some embodiments, a timestamp of the corresponding video frame in the video, or may be a frame sequence number of the video frame or the like. For example, the time attribute of the video frame may be the $2.0^{th}$ second, which means that the video frame is a video frame at the $2.0^{th}$ second in the video to which the video frame belongs. For another example, the time attribute of the video frame may be 500, which means that the video frame is a video frame at the $500^{th}$ frame in the video to which the video frame belongs. A position of the video frame in the corresponding video may be marked through the time attribute, and a time at which the video frame appears in the corresponding video is determined. A video is obtained by combining a plurality of video frames according to time information. A time attribute carrying time information is set for each video frame in the video. The time offset is configured to represent, in a video frame pair, a time interval between a time at which a to-be-recognized video frame appears in the target video and a time at which a reference video frame appears in the reference video. The time offset is obtained according to the respective time attributes of the to-be-recognized video frame and the reference video frame. For example, in a video frame pair, a time attribute of a to-be-recognized video frame may be the $2^{nd}$ second, that is, the to-be-recognized video frame is a video frame at the $2^{nd}$ second in a target video, and a time attribute of a series reference video frame may be a video frame at the $3^{rd}$ second, that is, the series reference video frame is a video frame at the $3^{rd}$ second in a series reference video. That is, the video frame at the $2^{nd}$ second in the target video matches the video frame at $3^{rd}$ second in the series reference video, so that a time offset of the video frame pair that is 1s may be obtained according to a difference between the time attribute of the to-be-recognized video frame and the time attribute of the series reference video frame.

In some embodiments, the server performs image matching on video frames of the target video and the series reference video, which may be, in some embodiments, performing image matching on video frames in the target video and video frames in the series reference video, for example, may be performing matching based on an image similarity, to determine video frame pairs based on matching results. The video frame pairs are image pairs formed by combining video frames that have been successfully image-matched. In a case that a video frame pair is determined by performing image matching based on the similarity, a to-be-recognized video frame and a series reference video frame in the video frame pair have a high image similarity. That is, the to-be-recognized video frame in the target video is similar to the series reference video frame in the series reference video, and they may be same video content, for example, video frames belonging to an opening or video frames belonging to an ending. For the obtained video frame pairs, the server determines time attributes of the to-be-recognized video frames in the video frame pairs and time attributes of the series reference video frames in the video frame pairs. In some embodiments, the corresponding time attributes may be determined by querying for frame information of the to-be-recognized video frames and the series reference video frames. The server determines time offsets of the video frame pairs based on the time attributes of the to-be-recognized video frames and the time attributes of the series reference video frames. For example, in a case that the time attributes are quantized into values, the server may obtain the time offsets of the video frame pairs according to numerical differences between the time attributes of the to-be-recognized video frames and the time attributes of the series reference video frames. The server performs sifting on the video frame pairs based on the time offsets and sifts video frame pairs with matching time offsets. In some embodiments, the server may sift video frame pairs whose time offsets have a same value or have numerical differences falling within a specific range. The server determines time attributes of to-be-recognized video frames in the sifted video frame pairs based on the sifted video frame pairs and obtains a series local similar clip in the target video relative to the series reference video based on the time attributes of the to-be-recognized video frames. For example, after determining the time attributes of the to-be-recognized video frames in the sifted video frame pairs, the server may determine a start time and an end time according to values of the time attributes of the to-be-recognized video frames, to determine the series local similar clip in the target video according to the start time and the end time.

During specific application, the server may group the video frame pairs according to the values of the time offsets, to obtain video frame pair sets corresponding to different time offsets. The video frame pair set includes video frame pairs matching the corresponding time offsets. For example, in a case that time offsets of the obtained video frame pairs include three types, 1s, 4s, and 5s, in total, the server may use video frame pairs with the time offset of is as a first video frame pair set, and determines the series local similar clip in the target video based on time attributes of to-be-recognized video frames in the video frame pairs in the first video frame pair set. The server may use video frame pairs with the time offsets of 4s and 5s as a second video frame pair set, and determines the series local similar clip in the target video based on time attributes of to-be-recognized video frames in the video frame pairs in the second video frame pair set. The server may determine respective series local similar clips based on time attributes of to-be-recognized video frames in video frame pairs in video frame pair sets, and combines the series local similar clips determined according to the video frame pair sets. For example, the server may delete a duplicate series local similar clip and update series local similar clips that partially overlap with each other, to obtain the series local similar clip in the target video relative to the series reference video.

In some embodiments, image matching is performed on the video frames of the target video and the series reference video in the video series, to obtain video frame pairs including to-be-recognized video frames belonging to the target video and series reference video frames image-matching the to-be-recognized video frames, determine time offsets of the video frame pairs according to time attributes of the to-be-recognized video frames in the video frame pairs and time attributes of the series reference video frames in the video frame pairs, sift video frame pairs with matching time offsets, and determine the series local similar clip in the target video relative to the series reference video based on time attributes of to-be-recognized video frames in the sifted video frame pairs. For the target video and the series reference video in the video series, time offsets of video frame pairs are determined according to time attributes of the image-matched to-be-recognized video frames and time attributes of the series reference video frames, and the series local similar clip in the target video relative to the series reference video is determined based on time attributes of to-be-recognized video frames in sifted video frame pairs with matching time offsets, so that similar video clips with different durations may be determined flexibly based on the image-matched video frame pairs, which improves accuracy of recognition on similar video clips in various videos.

In some embodiments, the sifting video frame pairs with matching time offsets, and determining the series local similar clip in the target video relative to the series reference video based on time attributes of to-be-recognized video frames in the sifted video frame pairs includes: performing numerical matching on the time offsets of the video frame pairs, and sifting, according to numerical matching results, video frame pairs with numerically matching time offsets; determining a start time and an end time based on the time attributes of the to-be-recognized video frames in the sifted video frame pairs; and determining the series local similar clip in the target video relative to the series reference video according to the start time and the end time.

The time offset represents, in a video frame pair, a time interval between a time at which a to-be-recognized video frame appears in the target video and a time at which a series reference video frame appears in the series reference video. A specific form of the time offset is a quantized value, for example, may be a value in seconds, indicating a time difference in seconds between times at which a to-be-recognized video frame and a series reference video frame in a video frame pair appear in their respective videos. The numerical matching refers to performing matching on values of time offsets of video frame pairs, to obtain a numerical matching result. The numerical matching result may include a numerical difference between the time offsets of the video frame pairs, that is, a difference between values of the time offsets. The start time refers to a start time of a video clip, and the end time refers to an end time of the video clip. Based on the start time and the end time, the start time is used as a video start time point, and the end time is used as a video end time point, so that the start time to the end time may be used as a span of the video, and a corresponding video clip can be determined.

In some embodiments, the server performs numerical matching on the time offsets of the video frame pairs. In some embodiments, numerical matching may be performed on the time offsets of the video frame pairs pairwise, to obtain a numerical matching result. The server determines video frame pairs with numerically matching time offsets based on the obtained numerical matching result. For example, the numerical matching result may include numerical differences between the time offsets of the video frame pairs. The server may determine, in the time offsets of the video frame pairs, time offsets between which a difference is less than a preset threshold as numerically matching time offsets, to sift video frame pairs according to the numerically matching time offsets. After the sifted video frame pairs with numerically matching time offsets are obtained, the server determines time attributes of to-be-recognized video frames in the sifted video frame pairs. In some embodiments, frame information of the to-be-recognized video frames may be queried for, to obtain the time attributes of the to-be-recognized video frames. The server determines a start time and an end time according to the time attributes of the to-be-recognized video frames.

During specific application, after the time attributes of the to-be-recognized video frames in the sifted video frame pairs are obtained, the server may determine a time attribute with a smallest value in the time attributes of the to-be-recognized video frames and determine the start time based on the time attribute with the smallest value. The server may determine a time attribute with a largest value in the time attributes of the to-be-recognized video frames and determine the end time based on the time attribute with the largest value. For example, in an application, in a case that an array of the time attributes of the to-be-recognized video frames in the sifted video frame pairs is {1, 3, 4, 5, 6, 7, 8, 9, 10, 12, 15}, the server may use the $1^{st}$ second as the start time and the $15^{th}$ second as the end time. The server determines the series local similar clip in the target video relative to the series reference video according to the start time and the end time. For example, the server may determine a video clip between the start time and the end time in the target video as the series local similar clip. For example, in a case that the server determines to use the $1^{st}$ second as the start time and the $15^{th}$ second as the end time, the server may determine a video clip from the $1^{st}$ second to the $15^{th}$ second in the target video as the series local similar clip relative to the series reference video.

In some embodiments, numerical matching is performed on the time offsets of the video frame pairs, and the video frame pairs with numerically matching time offsets are sifted according to the numerical matching result. The start time and the end time are determined based on the time attributes of the to-be-recognized video frames in the sifted video frame pairs, and the series local similar clip in the target video is determined according to the start time and the end time. Therefore, the series local similar clip is determined from the target video based on the to-be-recognized video frames in the sifted video frame pairs, so that a similar video clip can be determined flexibly at a frame-level according to the to-be-recognized video frames, which is applicable to a video including similar video clips of different durations, thereby improving the accuracy of recognizing a similar video clip in a video.

In some embodiments, the performing numerical matching on the time offsets of the video frame pairs, and sifting, according to numerical matching results, video frame pairs with numerically matching time offsets includes: performing numerical comparison on the time offsets of the video frame pairs respectively, to obtain numerical comparison results; sifting, based on the numerical comparison results, video frame pairs having numerical differences between time offsets less than a numerical difference threshold from the video frame pairs; and performing an offset update on the video frame pairs having the numerical differences between the time offsets less than the numerical difference threshold, to obtain the video frame pairs with the numerically matching time offsets.

The numerical comparison refers to comparing values of the time offsets of the video frame pairs to obtain numerical comparison results. The numerical comparison results may include numerical differences between the time offsets of the video frame pairs. For example, in a case that a time offset of a video frame pair 1 is 1s, and a time offset of a video frame pair 2 is 2s, a numerical difference between the time offsets of the video frame pair 1 and the video frame pair 2 is Is. That is, a numerical comparison result of performing numerical comparison on the time offsets of the video frame pair 1 and the video frame pair 2 is 1s. The numerical difference threshold is flexibly set according to actual needs. The numerical difference threshold is configured for performing matching on the time offsets of the video frame pairs. In some embodiments, video frame pairs having numerical differences between time offsets less than the numerical difference threshold are used as the sifted video frame pairs. The offset update is updating the time offsets of the video frame pairs having the numerical differences between the time offsets less than the numerical difference threshold, to make the time offsets of the video frame pairs match each other. For example, the time offsets of the video frame pairs may be updated and unified into the same time offset.

In some embodiments, the server performs numerical comparison on the time offsets of the video frame pairs respectively, to obtain numerical comparison results. The numerical comparison results can include numerical differences between the time offsets of the video frame pairs, which may be obtained by the server respectively performing subtraction on the time offsets of the video frame pairs pairwise. The server determines the preset numerical difference threshold and sifts, based on the numerical comparison results, video frame pairs having numerical differences between time offsets less than a numerical difference threshold from the video frame pairs. In some embodiments, the server compares the numerical differences in the numerical comparison result with the numerical difference threshold, determines video frame pairs associated with time offsets whose numerical differences are less than the numerical difference threshold, and sifts such video frame pairs from the video frame pairs. The server performs the offset update on the video frame pairs having the numerical differences between the time offsets less than the numerical difference threshold. In some embodiments, the time offsets of the video frame pair may be updated and unified to the same value, for example, updated to a minimum value of the time offsets of the video frame pairs having the numerical differences between the time offsets less than the numerical difference threshold, thereby obtaining the video frame pairs with numerically matching time offsets. For example, the numerical difference threshold is 2s. In a case that in the sifted video frame pairs having the numerical differences between the time offsets less than the numerical difference threshold, there are two types of time offsets, that is, is and 2s, the server may update time offsets of video frame pairs whose time offsets are 2s into Is, to obtain video frame pairs having the time offsets of Is, that is, obtain video frame pairs with numerically matching time offsets.

In some embodiments, based on the numerical comparison results obtained by performing numerical comparison on the time offsets of the video frame pairs, the video frame pairs having the numerical differences between the time offsets less than numerical difference threshold are sifted from the video frame pairs, and the offset update is performed on the sifted video frame pairs, to obtain the video frame pairs with the numerically matching time offsets, so that the video frame pairs configured for determining the series local similar clip are sifted, and the series local similar clip relative to the series reference video can be accurately recognized from the target video through the sifted video frame pairs.

In some embodiments, the determining a start time and an end time based on the time attributes of the to-be-recognized video frames in the sifted video frame pairs includes: obtaining a video frame pair list including the sifted video frame pairs; sorting, in the video frame pair list, the video frame pairs in ascending order according to values of the time offsets, and sorting video frame pairs with the same time offset in ascending order according to values of timestamps of to-be-recognized video frames included in the video frame pairs with the same time offset, the timestamps being determined according to time attributes of the included to-be-recognized video frames; determining, in the video frame pair list, time attribute distances between time attributes of to-be-recognized video frames in adjacent video frame pairs; determining adjacent video frame pairs whose time attribute distances do not exceed a distance threshold as video frame pairs belonging to the same video clip; and determining the start time and the end time according to timestamps of to-be-recognized video frames in the video frame pairs belonging to the same video clip.

The video frame pair list is formed by sorting the sifted video frame pairs. In the video frame pair list, the video frame pairs are sorted in ascending order according to the values of the time offsets, and the video frame pairs with the same time offset are sorted in ascending order according to the values of the timestamps of the to-be-recognized video frames included in the video frame pairs with the same time offset. The timestamps are determined according to the time attributes of the included to-be-recognized video frames. The timestamp is a time point at which a to-be-recognized video frame appears in the target video. In the video frame pair list, sorting is performed in ascending order according to the values of the time offsets. In a case that the time offsets are the same, sorting is performed in ascending order according to the values of the timestamps of the to-be-recognized video frames included in the video frame pairs. That is, in the video frame pair list, a video frame pair with a smaller time offset ranks higher, and for video frame pairs with the same time offset, a video frame pair with a smaller timestamp of a to-be-recognized video frame included therein ranks higher. The time attribute distance is determined according to time attributes of to-be-recognized video frames included in adjacent video frame pairs in the video frame pair list, and is configured to represent a time interval between the adjacent video frame pairs. The distance threshold is preset according to actual needs and is configured for determining whether adjacent video frame pairs belong to the same video clip. In some embodiments, the adjacent video frame pairs whose time attribute distance does not exceed the distance threshold may be determined as video frame pairs belonging to the same video clip, so that video clip aggregation is performed on the video frame pairs, to determine the start time and the end time.

In some embodiments, the server obtains the video frame pair list obtained by sorting the sifted video frame pairs. During specific application, the server may sort the sifted video frame pairs in ascending order according to the values of the time offsets. Moreover, for the video frame pairs with the same time offset, the server can determine the time attributes of the to-be-recognized video frames included in the video frame pairs, to determine the timestamps, and sort the video frame pairs in ascending order according to the values of the timestamps of the to-be-recognized video frames, to obtain the video frame pair list. In the video frame pair list, the server compares the time attributes of the to-be-recognized video frames in the adjacent video frame pairs. In some embodiments, subtraction is performed on the respective time attributes, to obtain the time attribute distances. The server determines the preset distance threshold, compares the time attribute distances with the distance threshold, determines, from the video frame pair list according to comparison results, adjacent video frame pairs whose time attribute distances do not exceed the distance threshold, and determines the adjacent video frame pairs whose time attribute distances do not exceed the distance threshold as video frame pairs belonging to the same video clip. That is, the time attribute distance between the to-be-recognized video frames in the adjacent video frame pairs is small, and it may be considered that the adjacent video frame pairs belong to the same video clip, so that a video clip is formed through aggregation based on the to-be-recognized video frames in the video frame pairs. The server determines the timestamps of the to-be-recognized video frames in the video frame pairs belonging to the same video clip, and determines the start time and the end time based on the timestamps of the to-be-recognized video frames. For example, the server may determine the start time according to the timestamp with the minimum value, and determine the end time according to the timestamp with the maximum value. The determined start time and end time are a start time and an end time of a video clip to which all video frame pairs belonging to the same video clip belong.

In some embodiments, based on the video frame pair list including the sifted video frame pairs, according to the time attribute distance between the time attributes of the to-be-recognized video frames in the adjacent video frame pairs, video frame pairs belonging to the same video clip are determined, and the start time and the end time are determined according to the timestamps of the to-be-recognized video frames in the video frame pairs belonging to the same video clip, so that reasoning and mining from the to-be-recognized video frames to the video clip can be implemented, which helps accurately recognize a similar clip from the target video.

In some embodiments, the determining the start time and the end time according to timestamps of to-be-recognized video frames in the video frame pairs belonging to the same video clip includes determining a start video frame pair and an end video frame pair in the video frame pairs belonging to the same video clip based on the timestamps of the to-be-recognized video frames in the video frame pairs belonging to the same video clip; obtaining the start time according to a timestamp of a to-be-recognized video frame in the start video frame pair; and determining the end time according to a timestamp of a to-be-recognized video frame in the end video frame pair.

A timestamp of a to-be-recognized video frame is determined according to a time attribute of the to-be-recognized video frame, and the timestamp of the to-be-recognized video frame represents a time point at which the to-be-recognized video frame appears in the target video. The start video frame pair and the end video frame pair are determined according to values of timestamps of the to-be-recognized video frames included in the video frame pairs belonging to the same video clip. The timestamp of the to-be-recognized video frame included in the start video frame pair may be a timestamp with the smallest value in the timestamps of the to-be-recognized video frames included in the video frame pairs belonging to the same video clip. The timestamp of the to-be-recognized video frame included in the end video frame pair may be a timestamp with the largest value. Therefore, the to-be-recognized video frame included in the start video frame pair is determined as a start video frame of the same video clip to which the video frame pairs belong, and the to-be-recognized video frame included in the end video frame pair is determined as an end video frame of the same video clip to which the video frame pairs belong.

In some embodiments, the server determines the timestamps of the to-be-recognized video frames in the video frame pairs belonging to the same video clip, and determines the start video frame pair and the end video frame pair in the video frame pair belonging to the same video clip based on values of the timestamps. In some embodiments, the server determines a video frame pair to which a to-be-recognized video frame with a smallest timestamp belongs as the start video frame pair, and determines a video frame pair to which a to-be-recognized video frame with a largest timestamp belongs as the end video frame pair. The server obtains the start time according to the timestamp of the to-be-recognized video frame in the start video frame pair. For example, a time point corresponding to the timestamp may be determined as the start time. The server obtains the end time according to the timestamp of the to-be-recognized video frame in the end video frame pair. For example, a time point corresponding to the timestamp may be determined as the end time.

In some embodiments, the server determines the start video frame pair and the end video frame pair based on the timestamps of the to-be-recognized video frames in the video frame pairs belonging to the same video clip, determines the start time and the end time respectively according to the to-be-recognized video frames respectively included in the start video frame pair and the end video frame pair, so that reasoning and mining from the to-be-recognized video frames belonging to the same video clip to the video clip can be implemented, which improves the accuracy of recognizing a similar video clip from the target video.

In some embodiments, the video recognition method further includes: determining a clip overlapping relationship between series local similar clips based on respective start times and end times of the series local similar clips; and performing a clip update on the series local similar clips based on the clip overlapping relationship, to obtain updated series local similar clips in the target video relative to the series reference video.

In a case that there are a plurality of series local similar clips recognized from the target video relative to the series reference video, the series local similar clips may be updated according to the clip overlapping relationship between the series local similar clips, to obtain the updated series local similar clips. The clip overlapping relationship refers to an overlapping relationship that exists between the series local similar clips. For example, in a case that a time range of a series local similar clip A is (2, 5), that is, from the $2^{nd}$ second to the $5^{th}$ second of the target video, and a time range of a series local similar clip B is (3, 4), the series local similar clip A completely covers the series local similar clip B. In this case, the series local similar clip B may be deleted, and the series local similar clip A is retained. In a case that a time range of a series local similar clip C is (2, 6), and a time range of a series local similar clip D is (5, 8), the series local similar clip C partially overlaps with the series local similar clip D. In this case, extension and updating may be performed based on the series local similar clip C and the series local similar clip D, to obtain an updated series local similar clip CD (2, 8). In a case that a time range of a series local similar clip E is (4, 8), and a time range of a series local similar clip F is (1, 5), the series local similar clip E partially overlaps with the series local similar clip F. In this case, extension and updating may be performed based on the series local similar clip E and the series local similar clip E, to obtain an updated series local similar clip EF (1, 8). In addition, if a plurality of series local similar clips do not overlap each other, for example, (2, 5) and (7, 10), the series local similar clips may not be combined, and the series local similar clips that do not overlap each other are all directly determined as video recognition results. For different clip overlapping relationships, different updating methods may be set, to ensure the accuracy of updating the series local similar clip.

In some embodiments, in a case that a plurality of series local similar clips are obtained, the server may determine a clip overlapping relationship between the series local similar clips based on respective start times and end times of the series local similar clips. The clip overlapping relationship, for example, may be inclusion, partially overlapping, or non-overlapping. The server performs a clip update on the series local similar clips based on the clip overlapping relationship between the series local similar clips. In some embodiments, processing, such as combination, deletion, or retention, may be performed on the series local similar clip, obtain the updated series local similar clips in the target video relative to the series reference video.

In some embodiments, in a case that a plurality of series local similar clips are recognized, a clip update is performed based on the clip overlapping relationship between the series local similar clips, to obtain a more accurate series local similar clip, which improves accuracy of recognizing the series local similar clip from the target video.

In some embodiments, there are at least two series reference videos. The sifting video frame pairs with matching time offsets, and determining the series local similar clip in the target video relative to the series reference video based on time attributes of to-be-recognized video frames in the sifted video frame pairs includes: sifting the video frame pairs with the matching time offsets, and determining intermediate similar clips in the target video relative to the series reference videos based on the time attributes of the to-be-recognized video frames in the sifted video frame pairs; performing, in the intermediate similar clips in the target video relative to the series reference videos, a clip update on intermediate similar clips having an overlapping relationship, to obtain the series local similar clips in the target video relative to the series reference videos.

There are at least two series reference videos. That is, video frame matching processing is performed on the target video respectively through the at least two series reference videos. The intermediate similar clip refers to a similar clip that is in the target video and that is recognized relative to a single series reference video. The overlapping relationship refers to an overlapping association existing between intermediate similar clips recognized based on different series reference videos, and may be, in some embodiments, determined according to time endpoints, including start times and end times, of the recognized intermediate similar clips.

In some embodiments, the server may obtain two or more series reference videos, and perform video recognition on the target video and the two or more series reference videos respectively, to obtain intermediate similar clips in the target video relative to the series reference videos. The server performs, in the intermediate similar clips in the target video relative to the series reference videos, a clip update on intermediate similar clips having an overlapping relationship, to obtain the series local similar clips in the target video relative to the series reference videos.

In some embodiments, video recognition is performed on the target video through a plurality of series reference video, and a clip update is performed on intermediate similar clips based on an overlapping relationship existing between the recognized intermediate similar clips, to obtain series local similar clips in the target video relative to the series reference videos, so that the series local similar clips recognized from the plurality of series reference videos are more accurate, which improves the accuracy of recognizing a similar clip in the target video.

In some embodiments, the performing, in the intermediate similar clips in the target video relative to the series reference videos, a clip update on intermediate similar clips having an overlapping relationship, to obtain the series local similar clips in the target video relative to the series reference videos, includes: performing clip position comparison on the intermediate similar clips in the target video relative to the series reference videos, to obtain clip comparison results; determining intermediate similar clips whose clip comparison results are having an overlapping relationship; and performing, in the intermediate similar clips in the target video relative to the series reference videos, a clip update on the intermediate similar clips having an overlapping relationship according to overlapping durations and statistics of the intermediate similar clips having an overlapping relationship, to obtain the series local similar clips in the target video relative to the series reference videos.

The clip position comparison refers to performing comparison on respective positions of the intermediate similar clips recognized based on the series reference videos in the target video, to obtain the clip comparison results. The clip comparison results may include whether there is an overlapping relationship between the intermediate similar clips. In a case that there is an overlapping relationship, the clip update may be performed on the intermediate similar clips having an overlapping relationship, to obtain the series local similar clips in the target video relative to the series reference videos. The overlapping duration refers to a duration of an overlapping clip at which the intermediate similar clips having an overlapping relationship overlaps each other. For example, in a case that a time range of an intermediate similar clip A determined according to a first series reference video is (2, 8), and a time range of an intermediate similar clip B determined according to a second series reference video is (5, 10), there is an overlapping relationship between the intermediate similar clip A and the intermediate similar clip B, an overlapping clip is (5, 8), and an overlapping duration is 4 seconds between the $5^{th}$ second and the $8^{th}$ second. The statistic may include a quantity of times that the same intermediate similar clip in the intermediate similar clips in the target video recognized relative to the series reference videos is recognized. A larger value of statistics indicates a larger quantity of times that the corresponding intermediate similar clip is recognized, and a possibility that the intermediate similar clip belongs to the series local similar clip is larger.

In some embodiments, the server determines the intermediate similar clips in the target video relative to the series reference videos. The server performs clip position comparison on the intermediate similar clips. The server may determine respective start times and end times of the intermediate similar clip and perform clip position comparison based on the start times and the end times of the intermediate similar clips, to obtain clip comparison results. In a case that the clip comparison results indicate that there is no overlapping relationship, the intermediate similar clips that do not have an overlapping relationship do not need to be processed, and all can be retained as the series local similar clips in the target video relative to the series reference videos. In a case that the clip comparison results indicate that there is an overlapping relationship, that is, there is a clip overlap between intermediate similar clips, the server determines intermediate similar clips having an overlapping relationship, and performs a clip update on the intermediate similar clips having an overlapping relationship, for example, performs various updating processing, such as deletion, combination, and retention, on the intermediate similar clips, to obtain the series local similar clips in the target video relative to the series reference videos. The server determines intermediate similar clips whose clip comparison results are having an overlapping relationship, and determines respective statistics of the intermediate similar clips having an overlapping relationship and an overlapping duration between the intermediate similar clips. The server performs, in the intermediate similar clips in the target video relative to the series reference videos, a clip update on the intermediate similar clips having an overlapping relationship according to overlapping durations and statistics of the intermediate similar clips having an overlapping relationship, to obtain the series local similar clips in the target video relative to the series reference videos. In some embodiments, the server may determine, according to a length of the overlapping duration, whether combination needs to be performed, and determine, according to the statistics, whether retention or combination needs to be performed.

In some embodiments, clip position comparison is performed on the intermediate similar clips in the target video relative to the series reference videos, and a clip update is performed on the intermediate similar clips whose clip comparison results are that an overlapping relationship exists. In some embodiments, a clip update is performed on the intermediate similar clips having an overlapping relationship according to an overlapping duration and statistics of the intermediate similar clips having an overlapping relationship. Therefore, the clip update is performed according to the overlapping duration and the statistics of the intermediate similar clip having the overlapping relationship are clip updated, which integrates characteristics between the intermediate similar clips, can improve the effect of the clip update, and helps improve the accuracy of recognizing the series local similar clips in the target video.

In some embodiments, the performing clip position comparison on the intermediate similar clips in the target video relative to the series reference videos, to obtain clip comparison results, includes: obtaining a similar clip list formed by the intermediate similar clips in the target video relative to the series reference videos; sorting, in the similar clip list, the intermediate similar clips in descending order according to statistics, and sorting intermediate similar clips with the same statistics in chronological order according to start times; and performing clip position comparison on the intermediate similar clips in the similar clip list, to obtain clip comparison results.

The similar clip list is obtained by sorting the intermediate similar clips in the target video relative to the series reference videos. In the similar clip list, the intermediate similar clips are sorted in descending order according to statistics, and intermediate similar clips with the same statistics are sorted in chronological order according to start times. That is, in the similar clip list, the intermediate similar clips are first sorted in descending order according to the statistic of the intermediate similar clip, and intermediate similar clips corresponding to the same statistics are sorted in chronological order according to the start times.

In some embodiments, the server obtains a similar clip list formed by the intermediate similar clips in the target video relative to the series reference videos. The similar clip list may be obtained by the server in advance by performing sorting according to the intermediate similar clips. In some embodiments, the intermediate similar clips may be first stored in descending order according to the statistics, and for intermediate similar clips having the same statistics, the server sorts them in chronological order according to the start times, to obtain the similar clip list. The server performs clip position comparison on the intermediate similar clips in the similar clip list, to obtain clip comparison results. During specific application, the server may perform clip position comparison sequentially from high to low according to the sorting of the intermediate similar clips in the similar clip list, obtain clip comparison results.

Further, the performing, in the intermediate similar clips in the target video relative to the series reference videos, a clip update on intermediate similar clips having an overlapping relationship, to obtain the series local similar clips in the target video relative to the series reference videos, includes: performing a clip update on a former intermediate similar clip through a latter intermediate similar clip in the intermediate similar clips having an overlapping relationship, to obtain the series local similar clips in the target video relative to the series reference videos. The former intermediate similar clip in the similar clip list is located at a sorting position before the latter intermediate similar clip.

That the former intermediate similar clip in the similar clip list is located at a sorting position before the latter intermediate similar clip means that compared with the former intermediate similar clip, the latter intermediate similar clip is an intermediate similar clip that is in the intermediate similar clips having an overlapping relationship and that ranks lower in the similar clip list. Moreover, compared with the latter intermediate similar clip, the former intermediate similar clip is an intermediate similar clip ranking higher in the similar clip list. For example, the similar clip list includes an intermediate similar clip A and an intermediate similar clip B. In a case that statistics of the intermediate similar clip A are higher than statistics of the intermediate similar clip B, in the similar clip list, the intermediate similar clip A ranks higher than the intermediate similar clip B. Therefore, the latter intermediate similar clip may be the intermediate similar clip B, and the former intermediate similar clip may be the intermediate similar clip A.

In some embodiments, the server may determine the latter intermediate similar clip and the former intermediate similar clip in the intermediate similar clips having an overlapping relationship. The server performs a clip update on the former intermediate similar clip through the determined latter intermediate similar clip, for example, performs various updating processing such as deletion, combination, and retention, to obtain the series local similar clips in the target video relative to the series reference videos.

In some embodiments, based on the similar clip list formed by the intermediate similar clips in the target video relative to the series reference videos, performing the clip update on the former intermediate similar clip through the latter intermediate similar clips in the intermediate similar clip having the overlapping relationship can ensure that an intermediate similar clip with higher statistics can be accurately retained, which can improve the effect of the clip update, and helps improve the accuracy of recognizing the series local similar clips in the target video.

In some embodiments, the performing, in the intermediate similar clips in the target video relative to the series reference videos, a clip update on intermediate similar clips having an overlapping relationship, to obtain the series local similar clips in the target video relative to the series reference videos, includes: performing the clip update on intermediate similar clips having an overlapping relationship in the intermediate similar clips in the target video relative to the series reference videos, to obtain updated intermediate similar clips; determining statistics of the updated intermediate similar clips; and obtaining, in a case that the statistics of the updated intermediate similar clip exceed a statistic threshold, the series local similar clip in the target video relative to the series reference videos according to the updated intermediate similar clips.

The statistic may include an accumulated quantity of times that the same intermediate similar clip in the intermediate similar clips in the target video recognized relative to the series reference videos is recognized. The statistic threshold is configured for determining whether an updated intermediate similar clip is an effective series local similar clip, and the statistic threshold may be set according to actual needs.

In some embodiments, the server performs, in the intermediate similar clips in the target video relative to the series reference videos, a clip update on intermediate similar clips having an overlapping relationship, to obtain the updated intermediate similar clips. The server determines statistics of the updated intermediate similar clips. In some embodiments, the server performs statistical processing on the updated intermediate similar clips, to obtain the statistics of the updated intermediate similar clips. The server determines a preset statistic threshold. In a case that the statistics of the updated intermediate similar clips exceed the statistic threshold, the updated intermediate similar clips may be considered as effective series local similar clips. According to the updated intermediate similar clips, the server obtains the series local similar clips in the target video relative to the series reference videos. For example, the server may use the updated intermediate similar clips as the series local similar clips in the target video relative to the series reference videos.

In some embodiments, the effectiveness of the updated intermediate similar clips is determined through the statistic threshold. After the effective determination is passed, the series local similar clips in the target video relative to the series reference videos are obtained according to the updated intermediate similar clips, which can ensure the effectiveness of the recognized series local similar clips.

In some embodiments, the video recognition method further includes: obtaining, according to the comprehensive similar clip in a case that the comprehensive similar clip satisfies a determination condition for a public video type, a public video matching the public video type in the target video.

The public video type refers to a type of a video shared in videos, and for example, may include, but not limited to, types such as an opening, an ending, and an advertisement. The public video type may be set according to actual needs. The determination condition for a public video type is configured for determining whether a type of a comprehensive similar clip matches a public video type. In some embodiments, a public video distribution region associated with a public video type may be compared with a comprehensive similar clip, to determine whether the comprehensive similar clip matches the public video type, thereby determining a type of comprehensive similar clip. That the public video matches the public video type means that a type of the public video matches the public video type. The public video is a reused video clip of a determined type. For example, the public video may be video content, such as an opening, an ending, or an advertisement, that can be reused in videos.

In some embodiments, the server determines the determination condition for a public video type. In a case that the comprehensive similar clip satisfies the determination condition, the server obtains, according to the comprehensive similar clip, a public video matching the public video type in the target video. For example, the determination condition for a public video type may be a public video distribution range associated with the public video type. The server determines a time period of the comprehensive similar clip, and determines whether the time period of the comprehensive similar clip is in the public video distribution range. In a case that the time period of the comprehensive similar clip is in the public video distribution range, the server obtains a public video matching the public video type according to the comprehensive similar clip. In a case that the public video type is an opening type, an opening in the target video can be obtained according to the comprehensive similar clip. In some embodiments, the comprehensive similar clip may be used as the opening of the target video.

In some embodiments, in a case that the recognized comprehensive similar clip satisfies the determination condition for a public video type, the public video matching the public video type in the target video is obtained according to the comprehensive similar clip, to recognize the public video matching the public video type in the target video, which improves the recognition accuracy of recognizing the public video in the target video.

In some embodiments, the obtaining, according to the comprehensive similar clip in a case that the comprehensive similar clip satisfies a determination condition for a public video type, a public video matching the public video type in the target video includes: determining a public video distribution range associated the public video type of the target video; and obtaining, in a case that a time period of the comprehensive similar clip is in the public video distribution range, the public video matching the public video type in the target video according to the comprehensive similar clip.

The public video distribution range is a time distribution range of a public video belonging to a public video type in the target video. For example, in a case that the public video type is an opening type, a time distribution range associated thereto may be the first N seconds of the target video, for example, the first 20 seconds of the target video. That is, the time distribution range is the $0^{th}$ second to the $20^{th}$ second. The time period of the comprehensive similar clip refers to a time span of the recognized comprehensive similar clip in the target video. In some embodiments, the time period of the comprehensive similar clip may be determined according to a start time and an end time of the comprehensive similar clip, and in some embodiments, may directly be a time span from the start time to the end time.

In some embodiments, the server determines a public video distribution range associated with a public video type of the target video, different public video types, and different public video distribution ranges. For example, for a public video type that is an opening type, a public video distribution range associated thereto may be the first N seconds of a video, and for a public video type that is an ending type, a public video distribution range associated thereto may be the last M seconds of a video. The server determines a time period of a comprehensive similar clip. In some embodiments, the time period may be determined according to a start time and an end time of the comprehensive similar clip. In a case that the time period of the comprehensive similar clip is in a public video distribution range associated with a public video type, indicating that the comprehensive similar clip is in a time span range corresponding to the public video type, the server obtains a public video matching the public video type in the target video according to the comprehensive similar clip. For example, the server may use the comprehensive similar clip as the public video matching the public video type in the target video. In a case that the public video type is an ending type, the server uses the comprehensive similar clip as an ending in the target video.

In some embodiments, the public video matching the public video type in the target video is determined based on a result of comparison between the public video distribution range associated with the public video type and the time period of the comprehensive similar clip and according to the comprehensive similar clip, so that the accuracy of the public video matching the public video type recognized in the target video is ensured based on the preset public video distribution range, which improves the recognition accuracy of recognizing the public video in the target video.

In some embodiments, the video recognition method further includes: determining a start time and an end time of the public video; extracting a non-public video from the target video according to the start time and the end time when a video comparison trigger event occurs; and performing video comparison between the non-public video and a to-be-compared video.

The public video is a reused video clip of a determined type. For example, the public video may be video content, such as an opening, an ending, or an advertisement, that can be reused in videos. The start time of the public video refers to a time point at which the public video starts, and the end time of the public video refers to a time point at which the public video ends. The video comparison trigger event is a trigger event for comparing videos. Through comparison between videos, a similarity between the videos can be determined. The non-public video is another clip of video in the target video other than the public video. The non-public video is not a reused video clip and may be considered as main video content of the target video. The to-be-compared video is a video requiring video comparison. Through comparison between the non-public video and the to-be-compared video, a video similarity between the non-public video and the to-be-compared video may be determined.

In some embodiments, the server determines a start time and an end time of the public video, and when the video comparison trigger event occurs, for example, a video comparison event triggered by a user on a terminal, the server extracts the non-public video from the target video according to the start time and the end time of the public video. In some embodiments, the server removes the public video from the target video based on the start time and the end time of the public video, thereby extracting the non-public video from the target video. The server obtains the to-be-compared video and compares the to-be-compared video with the extracted non-public video, to obtain a video comparison result. The video comparison result may reflect a content similarity between the to-be-compared video and the extracted non-public video.

In some embodiments, based on the start time and the end time of the public video, the non-public video used for video comparison with the to-be-compared video is extracted from the target video, so that the non-public video in the target video can be accurately and quickly located, which helps improve the accuracy and processing efficiency of video comparison.

In some embodiments, the video recognition method further includes: determining a skip time point of the public video; playing the target video when a video playback event for the target video occurs; and performing playback by skipping the public video in a case that a playback progress of the target video reaches the skip time point.

The skip time point refers to a time point at which a public video is played and needs to be skipped during playback of the target video, that is, a time point at which the public video needs to be skipped and not played. The video playback event is a trigger event for playing the target video. In some embodiments, the server determines a skip time point in the public video. The skip time point may be at least one of the start time or the end time in the public video. That the server responds to the video playback event for the target video may be, in some embodiments, that a user triggers the video playback event for the target video on a terminal to play the target video on the terminal, and in a case that a playback progress of the target video reaches a skip time point, playback is performed by skipping the public video, that is, the public video is directly skipped, and the non-public video in the target video is played. During specific application, in a case that the public video is an opening, the skip time point may be the start time of the public video, that is, during playback the target video, the opening is skipped and the non-public video after the opening is played directly. For another example, in a case that the public video is an ending, the skip time point may be the end time of the public video. That is, during playback of the target video, the ending is skipped, and the playback is directly ended or is directly switched to playback of another video.

In some embodiments, during playback of the target video, in a case that the playback progress reaches the skip time point of the public video, playback of the public video is skipped, so that playback of a repeated public video can be skipped during video playback, which improves video playback efficiency.

In some embodiments, the performing image matching on video frames of the target video and the series reference video, to obtain video frame pairs, includes: extracting to-be-recognized video frames from the target video and extracting series reference video frames from the series reference video; extracting respectively video frame features from the to-be-recognized video frames and video frame features from the series reference video frames; and performing feature matching on the video frame features of the to-be-recognized video frames and the video frame features of the series reference video frames, and obtaining the video frame pairs according to to-be-recognized video frames and series reference video frames that are successfully feature-matched.

In some embodiments, after obtaining the target video and the series reference video, the server performs video frame extraction on the target video and the series reference video respectively. In some embodiments, the to-be-recognized video frames are extracted from the target video, and the series reference video frames are extracted from the series reference video. The server extracts video frame features from the to-be-recognized video frames and video frame features from the series reference video frames respectively. The server may perform feature extraction on the to-be-recognized video frames and the series reference video frames respectively through an image processing model, to obtain respective video frame features of the to-be-recognized video frames and the series reference video frames. The server performs feature matching on the video frame features of the to-be-recognized video frames and the video frame features of the series reference video frames. In a case that feature distance matching can be performed, a to-be-recognized video frame and a series reference video frame that correspond to a feature distance less than a feature distance threshold are determined to be successfully feature-matched. The server obtains the video frame pairs according to to-be-recognized video frames and series reference video frames that are successfully feature-matched.

In some embodiments, feature matching is performed by extracting video frames from the target video and the series reference video, to obtain a video frame pair according to a to-be-recognized video frame and a series reference video frame that are successfully feature-matched, to perform similar video clip recognition based on the video frame pair obtained through image matching, which ensures the accuracy of similar video clip recognition.

In some embodiments, the extracting respectively video frame features from the to-be-recognized video frames and video frame features from the series reference video frames includes: extracting respectively video frame features from the to-be-recognized video frames and video frame features from the series reference video frames through an image processing model.

The image processing model may be a pre-trained artificial neural network model, and for example, may be a neural network in various forms such as a convolutional neural network and a residual network. In some embodiments, the server extracts respectively video frame features from the to-be-recognized video frames and video frame features from the series reference video frames through the pre-trained image processing mode. During specific application, the image processing model may be a pre-trained triplet neural network model or a multi-task model.

Further, training of the image processing model includes the following operations: obtaining a training sample image carrying a classification label; performing feature extraction and image classification on the training sample image through a to-be-trained image processing model, to obtain a sample image feature and a sample image category of the training sample image; determining a model loss based on the sample image feature, the sample image category, and the classification label; and continuing training after updating the to-be-trained image processing model based on the model loss, to obtain a trained image processing model when completing the training.

The training sample image carries the classification label, and for the training sample image, a training data set may be set according to actual needs. The sample image feature is an image feature obtained by performing feature extraction on the training sample image through the to-be-trained image processing model, and the sample image category is a classification result obtained by classifying the training sample image based on the to-be-trained image processing model. The model loss is configured for updating a model parameter in the to-be-trained image processing model, to ensure that the to-be-trained image processing model can converge, thereby completing model training. In some embodiments, the server obtains a training sample image carrying a classification label, and performs feature extraction and image classification on the training sample image through a to-be-trained image processing model, to obtain a sample image feature and a sample image category outputted by the to-be-trained image processing model. The server determines a model loss based on the sample image feature, the sample image category, and the classification label. In some embodiments, a triplet loss may be determined based on the sample image feature, a classification loss may be determined based on the sample image category and the classification label, and may be, in some embodiments, a cross-entropy loss, and the model loss may be obtained according to the triplet loss and the classification loss. The server continues training after updating the to-be-trained image processing model based on the model loss, to obtain a trained image processing model when completing the training. The trained image processing model may perform image feature extraction on an inputted image frame and may also perform image classification on the inputted image frame.

In some embodiments, the to-be-trained image processing model is updated and trained based on the model loss determined according to the sample image feature, the sample image category, and the classification label, and the video frame features of the to-be-recognized video frames and the video frame feature of the series reference video frames are extracted through the trained image processing model, so that video frame features of inputted video frames are fully mined through the image processing model, which can improve the accuracy of video frame matching.

In some embodiments, the recognizing a platform global similar clip in the target video relative to the platform reference video according to a second matching result obtained by performing video frame matching on the target video and the platform reference video includes: performing image matching on video frames of the target video and the platform reference video, to obtain video frame pairs, the video frame pairs including to-be-recognized video frames belonging to the target video and further including platform reference video frames image-matching the to-be-recognized video frames in the platform reference video; determining time offsets of the video frame pairs based on time attributes of the to-be-recognized video frames in the video frame pairs and time attributes of the series reference video frames in the video frame pairs; and sifting video frame pairs with matching time offsets, and determining the platform global similar clip in the target video relative to the platform reference video based on time attributes of to-be-recognized video frames in the sifted video frame pairs.

In some embodiments, the platform global similar clip in the target video relative to the platform reference video may be recognized using a recognition method the same as that for the series local similar clip. The server performs image matching on video frames of the target video and the platform reference video. For an obtained video frame pair, the server determines a time attribute of a to-be-recognized video frame in the video frame pair and a time attribute of a platform reference video frame in the video frame pair. The server determines a time offset of the video frame pair based on the time attribute of the to-be-recognized video frame and the time attribute of the platform reference video frame. The server performs sifting on video frame pairs based on time offsets and sifts video frame pairs with matching time offsets. The server determines time attributes of to-be-recognized video frames in the sifted video frame pairs based on the sifted video frame pairs and obtains a platform global similar clip in the target video relative to the platform reference video based on the time attributes of the to-be-recognized video frames.

In some embodiments, for the target video and the platform reference video, time offsets of video frame pairs are determined according to time attributes of the image-matched to-be-recognized video frames and time attributes of the platform reference video frames, and the platform global similar clip in the target video relative to the platform reference video is determined based on time attributes of to-be-recognized video frames in sifted video frame pairs with matching time offsets, so that similar video clips with different durations may be determined flexibly based on the image-matched video frame pairs, which improves accuracy of recognition on similar video clips in videos.

Some embodiments further provide an application scenario. The foregoing video recognition method is applied to the application scenario. In some embodiments, the video recognition method is applied to the application scenario as follows:

During creation of a derivative work for videos, pure videos are needed as a material library, and especially, promotional content that has a positive effect on the creation needs to be removed from the videos. For example, in a case that a user video compilation needs to be generated, pure video parts without meaningless content, such as a user or platform advertisement, need to be sifted as materials from videos historically uploaded by the user, and then, the user compilation is generated in an intelligent video synthesis manner, for example, automatically extracting short video clips with highest aesthetic evaluation scores from all videos and piecing them. In this case, it is very important to clean, in advance, an opening, an ending, or non-main content of a short video or a small video uploaded by the user.

For such small videos of video users that are recorded by individual users in manners such as selfie-taking and production, that are within 2 minutes, and that focus on sharing life, tips, experiences, skills, and opinions, in addition to a video clip including individual user promotion information such as a user logo or two-dimensional barcode information, their openings or endings may also include a platform logo clip lasting 1 to 5 seconds, which is very short compared with those of films and television dramas. In addition, because some video creators may randomly change or modify an opening or ending screen, and during a specific period of time, a platform focuses on different promotion information, and a platform opening or ending screen may be caused to change, a difference may appear in every video opening or ending in videos uploaded by users. Moreover, a platform opening or ending may not be recognized normally after a specific period of time because new promotion information is added. How to effectively recognize a user-produced ultra-short opening or ending while being adapted to cleaning a non-main content video clip from a small video whose platform opening or ending is stable only in a specific period of time is a problem that urgently needs to be resolved for creation of a derivative work for videos. In addition, during mining of an opening or ending of a small video, whether there is an opening or ending of a platform logo type needs to be considered. The most direct query method is to compare a target video with global videos on a video platform, that is, to query whether a repeatable opening or ending appears between a specific target video and the global videos, which requires investment of more time and resources and is not practical in applications.

Because an opening or ending may include information such as different screens, different text announcements, a logo, and text of topic content of the present video, it is difficult to use a machine perform uniform recognition for special styles. The conventional method is generally annotating opening or ending information manually. However, manual annotation requires investment of a large quantity of annotation resources each time, and the processing efficiency is low. Moreover, most conventional opening or ending mining solutions are for input of a plurality of videos of a TV drama type, cannot resolve the problem of recognizing a self-media self-made material-specific opening or ending, and can support video opening or ending mining only for a case in which an opening or ending time period is fixed in a plurality of videos. However, in practice, many opening or ending times are not strictly aligned. In a case that different series information, different prologues, or the like are inserted into openings, strict alignment of opening times usually cannot be guaranteed. In addition, the conventional opening or ending mining method only supports recognition of openings or endings with equal durations, resulting in inaccurate recognition of openings or endings with non-equal durations. In a case that opening or ending recognition is performed using the frame-level video features, the frame-level video features cannot guarantee that frame pictures of a text type, for example, text announcements of main content, a title, and the like of the present episode, can be matched normally. That is, in practice, regardless of whether text content is the same, frame fingerprint features of the text type are similar to each other. Once there is any change in a duration of text frames, a located time point of an opening is caused to be incorrect. For example, a specific TV series may be warned about a content health issue after being played, and starting from a specific episode, text frames of outline content of the present video are added to an opening. As a result, a duration of text frames of the video of this episode is different from that of text frames in historical video frames. In addition, for many small videos, no corresponding series can be found. As a result, there is no effective video pair for opening or ending mining, and some small videos need to be compared with global videos. However, the global video comparison means performing mining based on massive videos. As a result, each time of mining is very time-consuming and difficult to implement. With regard to the solution of performing opening or ending mining by constructing an opening or ending library, only openings or endings in the opening or ending library can be queried. Updating of the opening or ending library relies on manual labor, which makes it difficult to perform opening or ending clipping on massive videos, and relying on manual labor too much makes it impossible to implement automation or automatic iteration and maintenance.

Based on this, by analyzing opening or ending performance of a video opening or ending in global videos and a local video range under a same user account, a method for recognizing a video opening or ending based on construction of and query on a global general opening or ending library in combination with frame-level timing similarity searching in local and global ranges of videos is provided. In some embodiments, the existing opening or ending detection effect is improved by constructing and maintaining a general opening or ending library, and a quantity of comparison video required for opening or ending mining in a global range is reduced with the help of an efficient global range video comparison list, so that an effect of mining newly-added openings or endings can be achieved within a limited time. In addition, through local video mining under a user account, user opening or ending clips that may not be regular can be quickly recognized, and finally, a user local mining result is combined with a global result, to implement video opening or ending mining. Dynamic global mining refers to a method of performing, in a general opening or ending mining manner based on a current queried video, real-time mining on global videos that are updated in real time. Moreover, local recognition refers to a method of performing opening or ending mining in videos belonging to the same user as a queried video or the same series as a queried video. Through global and local combination, a more comprehensive opening or ending can be obtained, which improves the accuracy of opening or ending recognition.

The video recognition method provided in some embodiments supports recognition of any user opening or ending and any platform opening or ending clip in a video, and general opening or ending library mining is performed through a recommended global matching list based on text optical character recognition (OCR), which can reduce an overall video processing volume while ensuring a general opening or ending mining effect. Moreover, cross-searching of two videos is achieved with the help of image sequence similarity searching, to find an opening or ending that can repeatedly appear. By constructing a dynamically updated library of general opening or endings, searching the library to query openings or endings during query inputting is supported, which improves response efficiency, so that opening or ending recognition of different types of videos can be supported. Compared with the conventional opening or ending recognition solution, the video recognition method provided in some embodiments supports recognition of openings or endings with non-equal lengths, and implements, with the help of video frame similarity sequence searching, opening or ending recognition under misaligned times or openings or endings with non-equal durations. Moreover, opening or ending mining is performed through searching in a general opening or ending library and efficient extraction of global videos for searching, which improves a general opening or ending mining capability while supporting mining of a new platform opening or ending, and satisfies a need that in an application, a dynamic update of platform promotion requires dynamic maintenance of general opening or ending recognition. In addition, the global video range that is searched is controlled, to prevent global searching of a large data amount consuming too many resources and too much time. In addition, a general opening or ending library or a keyword library supporting global library searching is maintained, so that in addition to supporting a capability of removing inventory openings or endings, a capability of mining an opening or ending or a keyword newly added in real time is supported. Moreover, an automatic repair capability is further provided for a missed opening or ending through simple manual intervention, which further improves the accuracy of video opening or ending recognition.

Figure 4:
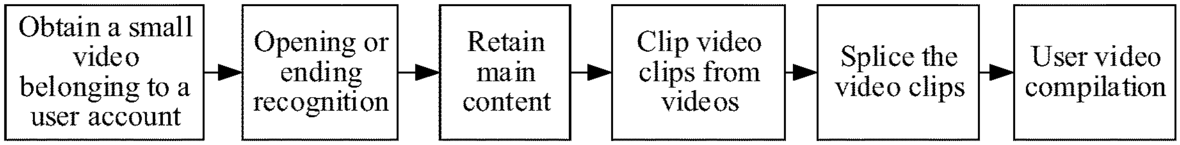
FIG. 4 is a schematic flowchart of producing a user video compilation according to some embodiments.
Figure 5:
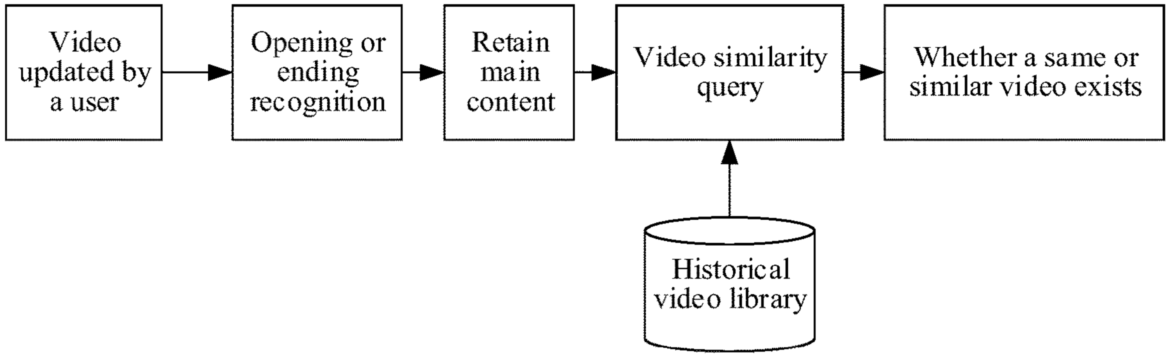
FIG. 5 is a schematic flowchart of video comparison according to some embodiments.
Figure 6:
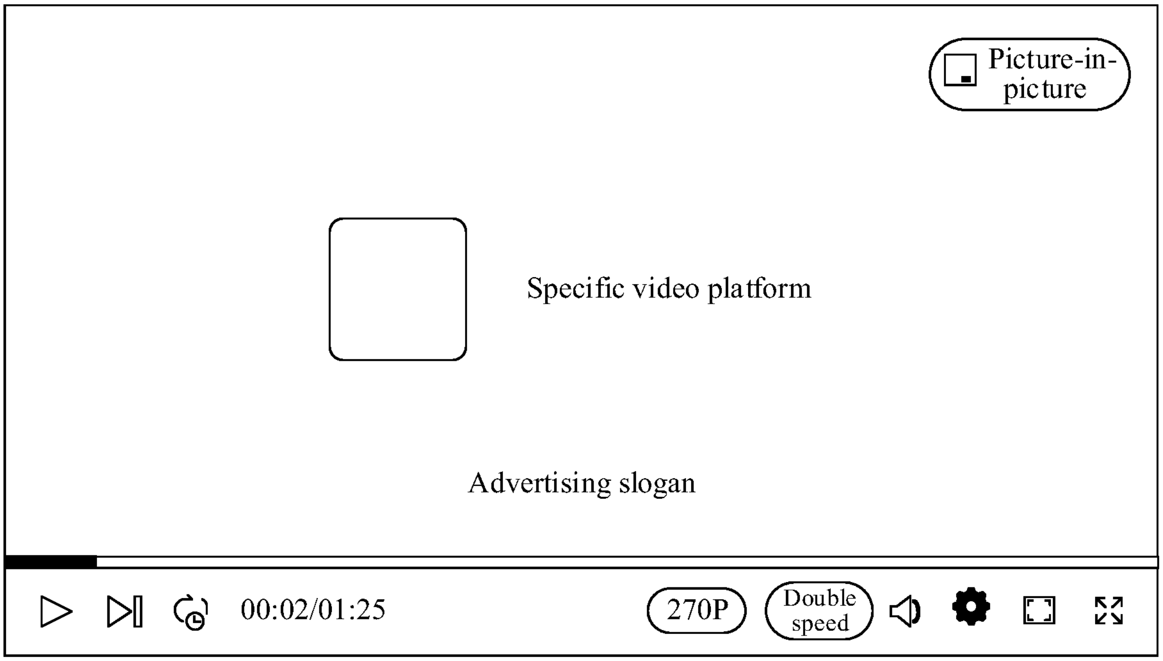
FIG. 6 is a schematic interface diagram of introducing a platform screen opening according to some embodiments.
Figure 7:
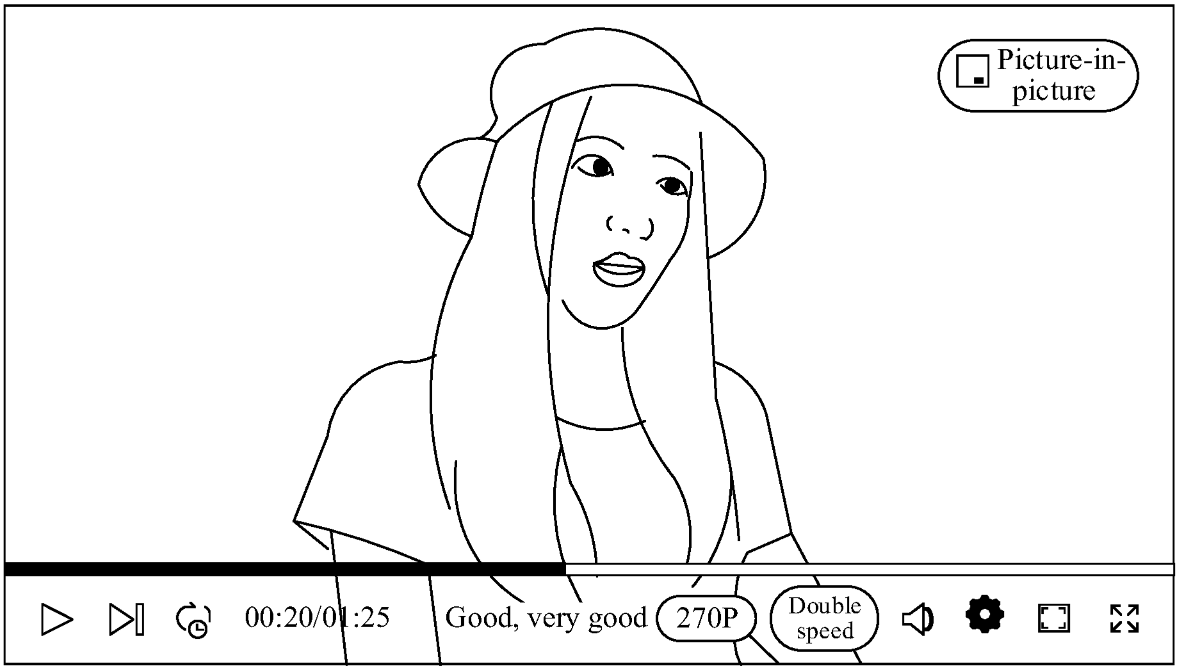
FIG. 7 is a schematic interface diagram of playing main content of a video according to some embodiments.
Figure 8:
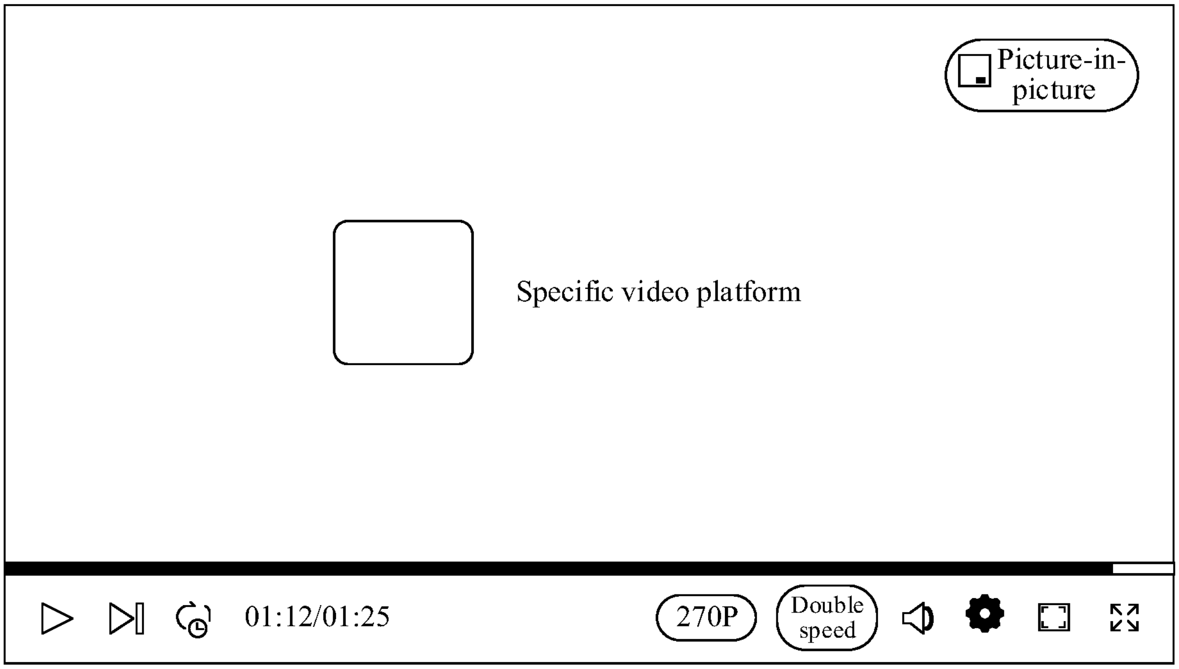
FIG. 8 is a schematic interface diagram of introducing a platform screen ending according to some embodiments.
Figure 9:
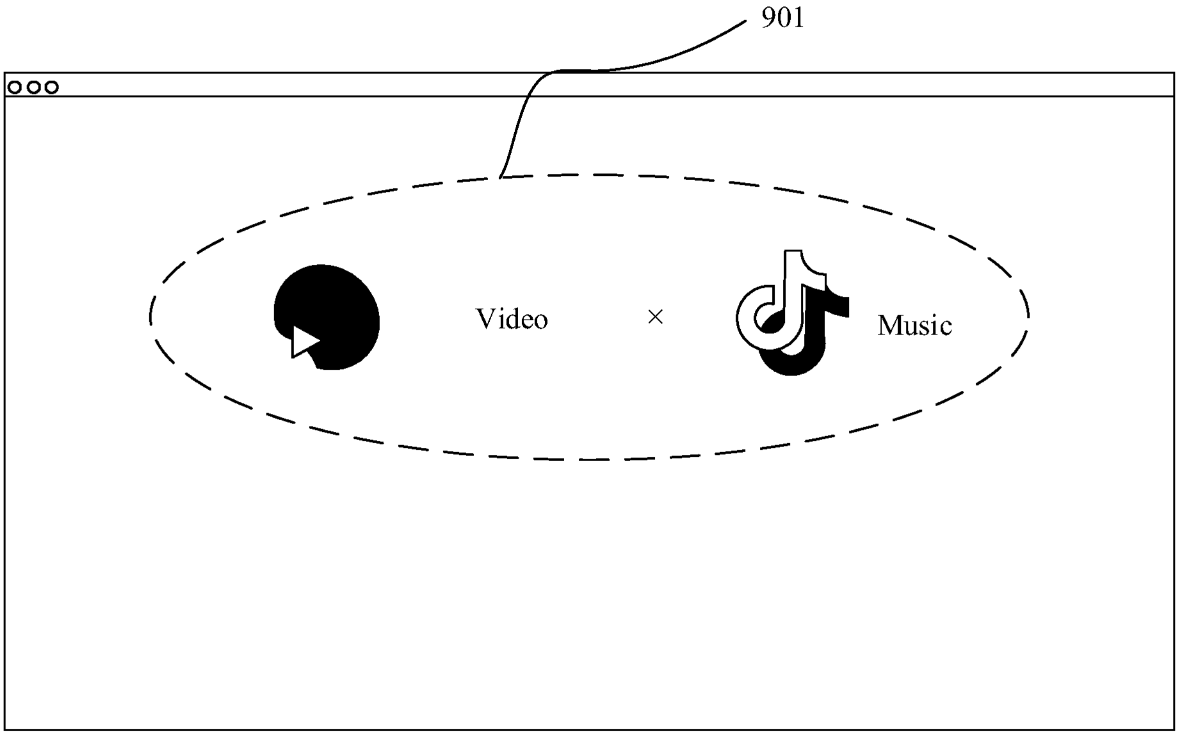
FIG. 9 is a schematic interface diagram of a first-stage video platform introduction screen according to some embodiments.
Figure 10:
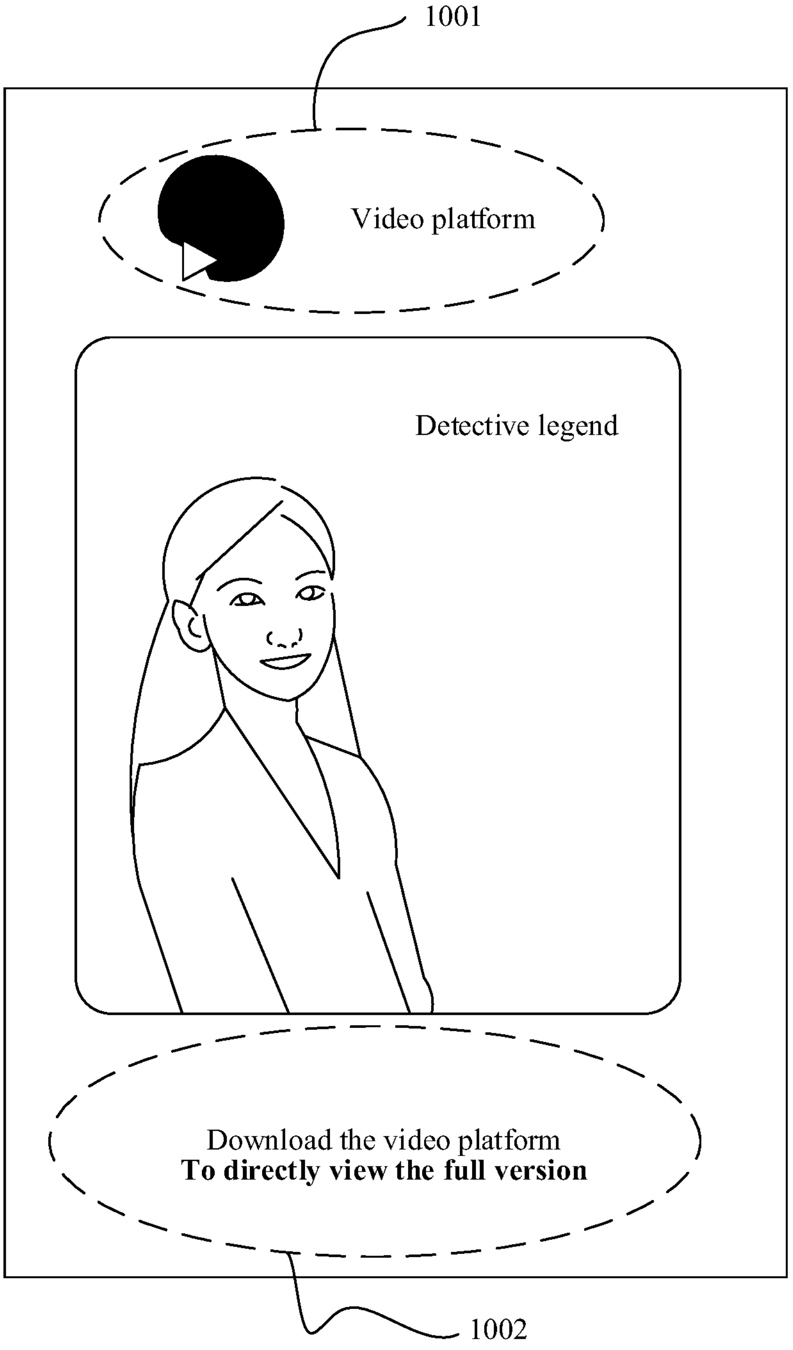
FIG. 10 is a schematic interface diagram of a second-stage video platform introduction screen according to some embodiments.

The video recognition method provided in some embodiments can be applied to a scenario such as performing opening or ending recognition of a small video, to remove an opening or an ending to obtain main content of the small video, and create a derivative work for the video or perform video comparison on the small video. As shown in FIG. 4, during creation of a derivative work for a user video compilation, after an opening or ending is removed from all videos uploaded by a user, main content of the videos is retained, and a video clip is clipped every 3 seconds for each video. Aesthetic evaluation scoring is performed on all screens of each clip of video, to obtain an average score as an aesthetic score of the clip of video. For all the videos of the user, a clip with a highest aesthetic score of each video is obtained, and a plurality of video clips are spliced and beautified through filters, to output the user video compilation. As shown in FIG. 5, in a user video comparison application scenario, for a specific video uploaded by a user, main content is retained after opening or ending recognition according to some embodiments is performed, and similar time period matching query is performed on the queried main content and a historical video library. In a case that there is a video in the historical video library matching the main content, indicating the video already exists in the historical video library or a similar video exists in the historical video library, fast video comparison can be implemented. As shown in FIG. 6, for a video A on a specific video platform, during playback, an opening having a platform introduction screen of the video platform is, in some embodiments, a screen at the 2$^{nd}$ second. As shown in FIG. 7, to play video content of the video A, in some embodiments, a screen at the 20$^{th}$ second in the video A includes a character. As shown in FIG. 8, in a case that the playback of the video A ends, an ending having the platform introduction screen of the video platform continues to be played, and is, in some embodiments, a screen at the 1 minute and 12$^{th}$ second. In a case that the video A on the video platform is edited, clips of the opening and the ending that have the platform introduction screen need to be removed, to retain main content of the video. Because a platform logo clip is often added by the platform in the same time period after videos are uploaded by a plurality of users, videos with the same logo clip can be found faster through same-stage global video query, so that the matching clip is determined as a general ending. As shown in FIG. 9, for a video platform A, in a first stage, an opening and an ending that have a platform introduction screen of the video platform A include a text and icon 901. As shown in FIG. 10, after updating in a period of time, in a second stage, in addition to including a text and icon 1001, the opening and the ending that have the platform introduction screen of the video platform A further include download promotion information 1002, and for example, in some embodiments, may include a download link of an application platform.

Figure 11:
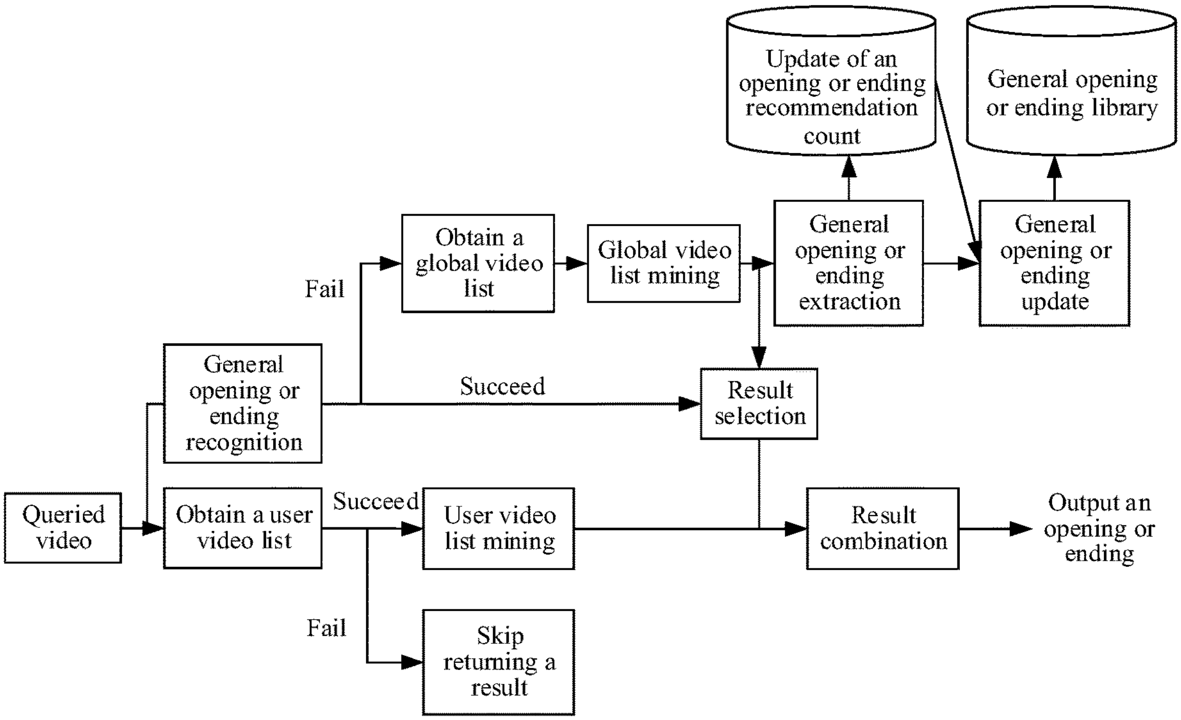
FIG. 11 is a schematic overall flowchart of a method for recognizing an opening or an ending according to some embodiments.

In some embodiments, in the video recognition method provided in some embodiments, as shown in FIG. 11, a queried video is a target video requiring video recognition. A user video list of the queried video is obtained. Each video in the user video list belongs to the same user account as the queried video. In a case that the user video list is successfully obtained, opening or ending mining is performed through videos in the user video list, to obtain an opening and an ending. In a case that the user video list is not obtained, opening or ending mining is performed on the user video list. Moreover, recognition is performed the queried video and a general opening or ending. In a case that no opening or ending is recognized, a global video list on a video platform is obtained. The global video list includes videos extracted from the video platform to which the queried video belongs. Opening or ending mining is performed on the queried video based on the global video list, to obtain an opening or an ending. A recognition result obtained through the general opening or ending is combined with a mining result obtained through the user video list, to obtain an opening or ending for output. Alternatively, a mining result obtained through the global video list is combined with a mining result obtained through the user video list, to obtain an opening or ending for output. In addition, for the mining result obtained through the global video list, a general opening or ending is extracted from the mining result, and an opening or ending recommendation count corresponding to the extracted general opening or ending is updated. In a case that a determination condition for a general opening or ending is satisfied, for example, after T days, the extracted general opening or ending is updated into a general opening or ending library.

Further, for a specific queried video, mining is first performed on other videos uploaded under the name of a user uploading the queried video. The mining includes similar time period searching between video pairs and frame-level OCR keyword query correction, and searching is performed in the general opening or ending library. In a case that there is no search result, indicating that it is possible that the current queried video includes a new opening or ending of a platform logo type. In this case, global video mining needs to be triggered. In some embodiments, a recognized OCR platform keyword is used to find recent videos including the same platform keyword from global videos to form a global video list, and similar time period searching is performed on the queried video and the global list videos. In a case that there is a result, indicating that a new platform logo type has appeared, the search result and a video search result under the name of the user are combined and outputted, and in addition, the new platform logo type is recommended to the general opening or ending library. In a case that there is no result, it indicates that the video does not have a matching opening or ending globally. Further, to ensure automatic addition of a general opening or ending, a new global general opening or ending mined each time is statistically processed through a recommended opening or ending library, to determine whether to recommend and update to the general opening or ending library.

As shown in FIG. 12, the video recognition method provided in some embodiments includes processing such as global library query, local list mining, global list generation, global list mining, recording a newly-added opening or ending into a general opening or ending library, and keyword library maintenance. In some embodiments, for the global library query, frame-level image embedding features of the queried video and frame-level image embedding features of the general opening or ending video library may be directly queried for. In some embodiments, frame-level images may be extracted respectively from the queried video and the general opening or ending video library, and frame-level features of the extracted frame-level images are obtained, to perform similar time period searching based on the frame-level features, and obtain a recognition result 1 according to a matching time period serving as an opening or ending found through the searching. In some embodiments, matching time periods between the queried video and a plurality of openings or endings in the global library are obtained through query, and a longest time period in the matching time periods is used as a final search result. In a case that no opening or ending matching time period is found, it is determined that no opening or ending in the queried video can be recognized based on general openings or endings in the global library.

For the global list mining, the same processing method as the local list mining can be used, and the only difference is that the video lists used for searching are different. That is, frame-level images are obtained respectively from the queried video and videos of the global list, and frame-level features are extracted from the frame-level images, to perform fixed-period sequence similarity searching, to obtain a recognition result 2. For the local list mining, the queried video and videos in the user video list are grouped pairwise into video pairs. For each video pair, frame-level images are obtained respectively, and frame-level features of the frame-level images are extracted for fixed-period sequence similarity searching. Therefore, similar clips are generated using the video frame images according to similar time period searching, all the video pairs are searched to obtain a plurality of similar clips, and the similar clips are combined to obtain a local opening or ending, to obtain a recognition result 4. Furthermore, for the frame-level images obtained from the video pairs, frame-level OCR is used to find a platform keyword from the keyword library, to obtain a recognition result 3, and the recognition result 4 is corrected through the recognition result 3. The recognition result 3 is combined the recognition result 4, to obtain a combination result.

In some embodiments, for the recognition result 3 and the recognition result 4, the recognition result 4 is high-confidence opening or ending information found through two video searches, and the recognition result 3 is information indicating whether a screen is an ineffective frame according to whether the screen includes some special words. Therefore, the recognition result 4 is corrected using the information from the recognition result 3. A function of the recognition result 3 is that because an opening or ending keyword that needs to be provided in a video, which, for example, as an ending, is a promotion page of a specific video platform, and is a still ineffective screen to creation of a derivative work for the video, for such special words, an ineffective screen near an opening or ending needs to be removed. In some embodiments, a screen with such text may be eliminated from the main content using a text search method. Text that needs to be eliminated is first saved in the keyword library. For an OCR result recognized from an inputted frame image, whether an inventory keyword appears in the OCR result is queried. In a case that the inventory keyword is hit, the present frame is regarded as an ineffective screen. It is determined whether all screens are ineffective according to whether all frames are hit, to correct an opening or ending time with the help of a text search result.

Figure 14:
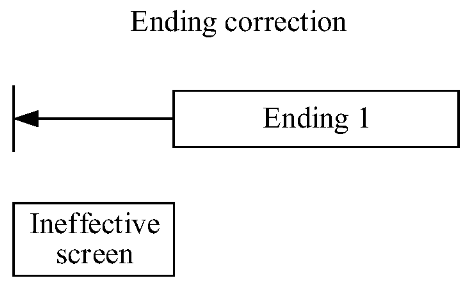
FIG. 14 is a schematic diagram of processing of ending correction according to some embodiments.

During specific application, for an opening cut-off time, where, for example, a cut-off time of an opening [2, 18] is the $18^{th}$ second, classification information starting from the opening cut-off time is searched for. In a case that more than 50% of main content screens starting from the opening cut-off time to an ending are ineffective, the ineffective screens are not cleaned. In a case that two or more frames of ineffective screens are included within 5 seconds after the opening cut-off time, that is, in the $19^{th}$ to $23^{rd}$ frames, the opening cut-off time is corrected to a time of the last ineffective frame. In a case that after the opening is cut off, there are all successive ineffective screens in a period of time, the opening cut-off time is directly modified to the longest continuous ineffective time. Likewise, for a start time of an ending, searching is performed in a period of time back from the start time. In a case that an ineffective screen appears, the start time of the ending is modified to a next second of the ineffective screen. As shown in FIG. 13, for an opening 1, a time of the opening 1 is extended to a cut-off time of recognized ineffective screens including a platform keyword. As shown in FIG. 14, for an ending 1, a time of the ending 1 is extended to a start time of recognized ineffective screens including a platform keyword.

For query through the global library, mining is performed through the global list or the local list, and fixed-period sequence similarity searching can always be performed based on frame-level features of frame-level images. In some embodiments, general openings or endings in the global library, global videos in the global list, or user videos in the local list are used as reference videos of the queried video, to form video pairs with the queried video. For the frame-level feature extraction, frames are extracted from a video to obtain frame-level images, and respective frame-level features are extracted from the frame-level images. For example, in a case that for a 6-second video of 25 frames per second (FPS), one frame is extracted every 1 second, a total of 6 images are extracted, and then, a video frame feature of each frame of the extracted images is obtained through a feature extractor, so that the video has 6 video frame features. In a case that a 3 frames per second frame extraction method is used, the time accuracy of the final opening or ending recognition is 0.33 seconds. For a small video with a short duration, in a case that higher time accuracy is needed, a 10 frames per second frame extraction method that has accuracy of 0.1 seconds and that is denser may be used. The video frame may be extracted through an image feature extractor. The image feature extractor may be a pooling layer output of an ResNet-101 neural network trained based on an open source classification data set Imagenet. Each image is converted into a 1×2048 image embedding vector. Imagenet is a large-scale open source data set for general object recognition. The image feature extractor may also be implemented based on different network structures and different pre-training model weights.

The image embedding is configured to describe a feature of image information, including an image underlying representation, an image semantic representation, and the like. The embedding is not limited to a floating point feature, and may also be an image representation formed by binary feature vectors, that is, deep hash features. The embedding feature in some embodiments may be a binarized depth hash feature. The image underlying representation is an image embedding from an underlying feature of deep learning and mainly describes representation information such as the full image texture and the feature layout. The image semantic representation is an image embedding from semantic learning and mainly describes a representation of a part with some specified semantic content in an image. For example, for an embedding configured to describe a dog, a feature at a position of the dog is extracted from an image as an image representation.

A convolutional neural network (CNN) deep representation module structure of ResNet-101 is shown in the following Table 1.

TABLE 1

| Layer structure name | Output size | ResNet-101 | |
|---|---|---|---|
| Convolution layer Conv1 | 300 × 500 | 7 × 7, 64, stride 2 | |
| Convolution layer Conv2_x | 150 × 250 | 3 × 3 max pool, stride 2<br>1 × 1, 64<br>3 × 3, 64<br>1 × 1, 256 | ×3 blocks |
| Convolution layer | 76 × 26 | 1 × 1, 128 | ×4 blocks |

TABLE 1-continued

| Layer structure name | Output size | ResNet-101 | |
|---|---|---|---|
| Conv3_x | | 3 × 3, 128 | |
| | | 1 × 1, 512 | |
| Convolution layer | 38 × 63 | 1 × 1, 256 | ×23 blocks |
| Conv4_x | | 3 × 3, 256 | |
| | | 1 × 1, 1024 | |
| Convolution layer | 19 × 32 | 1 × 1, 512 | ×3 blocks |
| Conv5_x | | 3 × 3, 512 | |
| | | 1 × 1, 2048 | |
| Pooling layer Pool | 1 × 2048 | Max pool | |

Further, for frame-extracted images, OCR recognition may be performed on each image to recognize text information on the image.

In embedding-based sequence similarity searching, during video time period matching, for each video pair (i, r) including a queried video and a list video, the list video being a video in the global library, the global list, or the local list, i represents the queried video whose opening or ending is to be determined, and r represents a specific list video used as a reference video. Assuming that there are 3 list videos, for the queried video i, a total of 3 times of embedding 1-based sequence similarity searching and 3 times of embedding 2-based sequence similarity searching need to be performed.

In some embodiments, the sequence similarity searching may also be referred to as a time period matching algorithm. One pair of videos is processed at a time, and an input of each video is its embedding sequence. A threshold in the time period matching algorithm may be dynamically adjusted according to needs of a service and a processed video. Operations of the time period matching algorithm according to some embodiments are as follows: A preset distance threshold t0 of a video frame feature embedding is 0.3. That is, in a case that a European distance between two embeddings is less than 0.3, it indicates that the two embeddings come from similar frames. The distance threshold may be flexibly set according to actual needs. Frames are extracted from two videos in a video pair, and an embedding of each frame is obtained. For each frame j in a video i, a European distance between the frame j and an embedding of each frame in a video r is calculated, a frame whose European distance is less than t0 is used as a similar frame of j, and the similar frame or a matching frame list sim-id-list of j is obtained while recording a corresponding similar frame time deviation diff-time-list. For example, for a frame j=1, a similar frame list sim-id-list is [1, 2, 3], which indicates being similar to the $1^{st}$, $2^{nd}$ and $3^{rd}$ seconds of the video r. The time deviation diff-time-list is [0, 1, 2], which represents distances between similar frames in the sim-id-list and a time represented by the frame j=1. Default frame extraction is extracting one frame per second, and therefore, a sequence number of the frame is a quantity of seconds. Therefore, the similar frame list SL and the time deviation list TL of all frames of i are obtained.

All the frames are traversed to count a quantity of matching frames between the videos i and r. That is, there is a matching quantity of j in the video r. In a case that the quantity of matching frames is less than 1, there is no same video clip between the videos i and r, and no opening or ending can be mined. Otherwise, re-sorting is performed according to time deviations dt, to obtain the list SL. In some embodiments, all matching frames in the SL are sorted in ascending order by the diff-time (that is, the dt). In a case of the same dt, sorting is performed in ascending order by the sequence number of the video i, and in addition, the corresponding diff-time-list is re-organized according to this sequence. That is, matching frames with a time difference of 0 ranks the highest, matching frames with a time difference of 1 ranks the second, and so on. For example, the new SL list is [10, 11], [11, 12], [2, 4], [3, 5], [4, 6], [6, 9], [7, 10].

Data is re-organized by using the dt, to obtain a match-dt-list. In some embodiments, lists in similar frame lists SL of all frames of i are re-organized using the time deviation as a main key to obtain a list in ascending order by the dt, to obtain the similar frame match-dt-list: {0:{count, start-id, match-id-list}, . . . } under the time deviations of 0, 1, 2 . . . , for example, {2:{3, 2, [[2, 4], [3, 5], [4, 6]]}, and 3:{2, 6, [[6, 9], [7, 10]]}}, 2 referring to a time difference of 2. For example, in a case that the $2^{nd}$ frame of i is similar to the $4^{th}$ frame of a video vid2, a time difference between the two frames is 1. count is a quantity of similar frames under the time deviation. In a case that the $2^{nd}$ frame of i is similar to the $4^{th}$ frame of vid2, count is increased by 1. start-id refers to a minimum frame id of i under this time difference. In a case that the $1^{st}$ frame of i is not similar to vid2, but the $2^{nd}$ frame of i is similar to the $4^{th}$ frame of the video vid2, start-id is 2.

Two dt lists whose previous dt and later dt are less than 3 (that is, matching pairs whose matching deviations are within 3s are combined) in the match-dt-list are combined, the list with a larger dt is combined into the list with a smaller dt, and in addition, similar frame matching with a larger dt is updated while the matching frame list SL is updated: As in the foregoing example, a list with a dt of 2 and a list with a dt of 3 can be combined, to finally obtain {2:{5, 2, [[2, 4], [3, 5], [4, 6], [6, 8], [7, 9]]}}, count being a sum of count of dt=2 and count of dt=3. A frame of the smallest video i is found according to start-id from the similar frame lists with dt=2 and dt=3. For the list of dt=3, a sequence number of a matched frame is rewritten and combined into the similar frame list with dt=2. For example, [6, 9] is rewritten into [6, 8] and combined into the similar frame list with dt=2. In addition, the similar frame pairs with rewritten frame sequence numbers are synchronously updated into the SL matching frame list of operation 5), for example, are updated to: [10, 11], [11, 12], [2, 4], [3, 5], [4, 6], [6, 8], [7, 9]. Because existence of the foregoing combined frame list may disrupt the order of dts or frame ids, re-sorting is needed. In some embodiments, dt re-sorting is processing of performing dt re-sorting on the new SL list once more to obtain an SL list, to obtain a matching frame list in ascending order by dt (in ascending order by the frame id of the video i). Data is re-organized using the dt to obtain the match-dt-list: The processing of re-organizing data using the dt is performed again, to obtain the match-dt-list.

A time period matching list match-duration-list is calculated. In some embodiments, a time interval between two matching clips is preset to be greater than T2 (for example, 8s, for 1 frame per second, a frame sequence number difference being 8). For each dt (for example, dt=2) in the match-dt-list, for each frame srcT of the video i under the dt (for example, 2 in 2, 3, 4, 6, and 7 in the foregoing example), in a case that a difference between the srcT and a previous srcT is greater than T2 (for example, in a case that a difference between 2 and the previous srcT 11 is 9, the time interval is greater than an interval threshold), the previous similar frame pair is combined into a matching clip, and new similar frame pairs are counted starting from the current srcT, and similar frames are stored in a temporary list tmplist. In a case that dt=2 and srcT=2, similar frames in the previous temporary frame list are saved as matching clips.

Figure 15:
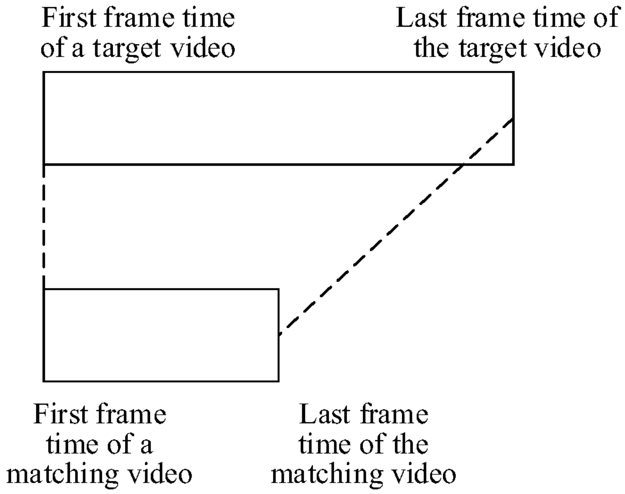
FIG. 15 is a schematic diagram of matching clip information according to some embodiments.

For example, similar frames in the previous tmplist=[[10, 11], [11, 12]] are added as matching clips to the match-duration-list. For example, matching clip information, such as [10, 11, 11, 12, 1, 2, 2], is added, the values representing [src-startTime, src-endTime, ref-startTime, ref-endTime, dt, duration, count]. That is, the matching clips save the following information of the two clips of videos: the first frame and the last frame of the video i, the first frame and the last frame of the matching video, dt of the matching clip, a duration of the matching clip, a quantity of matched similar frames. As shown in FIG. 15, the matching clip information includes information such as a first frame time of a target video, a last frame time of the target video, a first frame time of a matching video, and a last frame time of the matching video. The present similar frames are stored in the temporary list tmplist=[[2, 4]]. In a case that a difference between the srcT and the previous srcT is less than T2, the present similar frames are stored in the temporary list tmplist. For example, for dt2, srcT=3, 4, 6, and 7 are all stored in the temporary list, to obtain tmplist=[[2, 4], [3, 5], [4, 6], [6, 8], [7, 9]]. In a case that the current similar frames are the last similar frames of the present dt (for example, srcT=7), accumulated similar frames of tmplist form a matching clip and are added to the match-duration-list, for example, [2, 7, 4, 9, 2, 6, 5] are added, a duration being 7−2+1, count=5 being a count of similar frames, so that match-duration-list=[[10, 11, 11, 12, 1, 2, 2], [2, 7, 4, 9, 2, 6, 5]]. The foregoing match-duration-list is sorted in reverse order by the count of similar frames, for example, match-duration-list=[[2, 7, 4, 9, 2, 6, 5], [10, 11, 11, 12, 1, 2, 2]].

Figure 16:
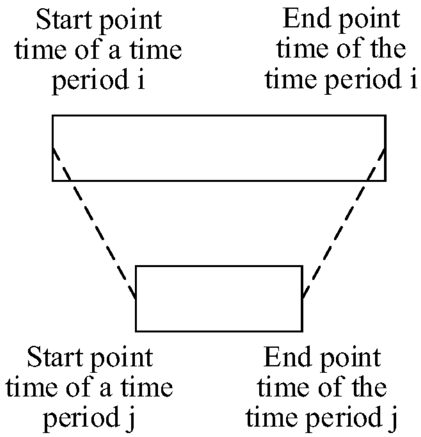
FIG. 16 is a schematic diagram of time period inclusion according to some embodiments.
Figure 17:
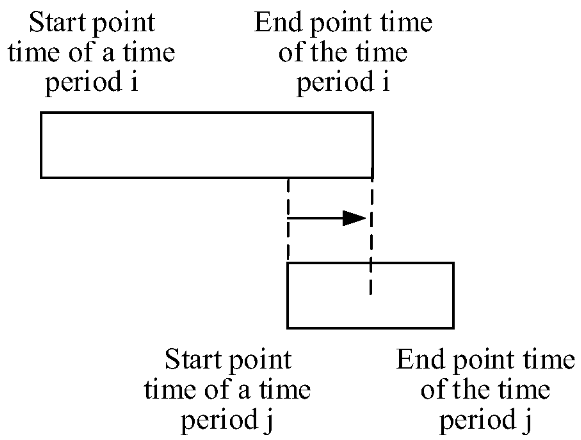
FIG. 17 is a schematic diagram of updating an end point time of an overlap existing between time periods according to some embodiments.
Figure 18:
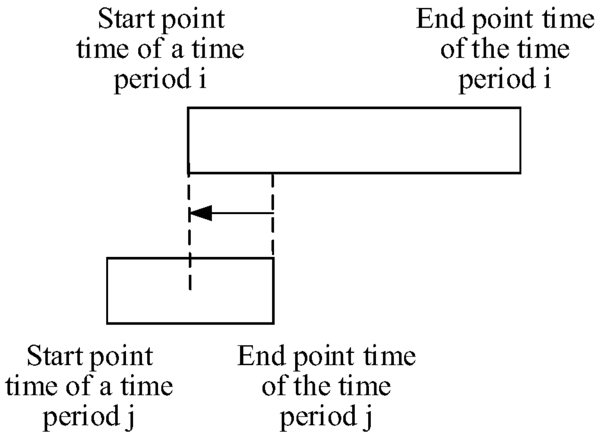
FIG. 18 is a schematic diagram of updating a start point time of an overlap existing between time periods according to some embodiments.

An overlapping time period in the match-duration-list is processed. Because the similar frame calculation is an operation of traversing all frames of two videos to perform distance calculation to obtain similar frames within a specific threshold range, it is likely that a specific frame is similar to a plurality of frames, resulting in existence of a temporal overlap between two matching time periods in the match-duration-list. Such a case needs to be handled. In some embodiments, a minimum matching clip duration T3 (for example, 5, indicating that the shortest matching duration is 5s) is set. For the time period i in the match-duration-list (referring to a time period formed by src-startTime and src-endTime), and the time period j=i+1 in the match-duration-list, in a case that the time period i includes the time period j, j is deleted. As shown in FIG. 16, a start point time of the time period i is before a start point time of the time period j, and an end point time of the time period i is after an end point time of the time period j. That is, the time period i includes the time period j, j needs to be deleted. In a case that i overlaps with j, and a start point of i is the earliest start point, a start point of j is moved backward to an end point position of i, to update j. In this case, in a case that a duration of the time period j is less than T3, j is deleted; otherwise, the old j is replaced with a new j. As shown in FIG. 17, in a case that a start point time of the time period i is before a start point time of the time period j, but an end point time of the time period i is before an end point time of the time period j, i overlaps with j. The end point time of the time period i needs to be updated to the end point time of the time period j. In a case that i overlaps with j, and a start point of j is the earliest start point, an end point of j is moved forward to a start point position of i, to update j. In this case, in a case that a duration of the time period j is less than T3, j is deleted; otherwise, the old j is replaced with a new j. As shown in FIG. 18, in a case that a start point time of the time period i is after a start point time of the time period j, and an end point time of the time period i is after an end point time of the time period j, i overlaps with j. The end point time of the time period i needs to be updated to the start point time of the time period j. Finally, the matching time period information, such as match-duration-list=[[2, 7, 4, 9, 2, 6, 5], [10, 11, 11, 12, 1, 2, 2]], is returned, or only the matching clip [[2, 7, 4, 9], [10, 11, 11, 12]] is returned.

For the processing of obtaining the same matching clip, for the queried video, after similarity sequence matching is performed on the queried video and the video list, 3 matching time periods are obtained, and the 3 time periods are aligned, to obtain the same matching clip based on the video list of the embedding. In some embodiments, for the video i, assuming that the video i needs to be mined from a video vid2, a video vid3, and a video vid4, for [I, vid2], [I, vid3], and [I, vid4], the foregoing video clip matching is performed on a total of N=3 video pairs respectively, to obtain 3 pieces of matching information. For example, for the first pair of video matching clips, [[2, 7, 4, 9], [10, 11, 11, 12]] is returned, for the second pair of matching clips, [[2, 7, 4, 9]] is returned, and for the third pair of matching clips, [[2, 7, 4, 10]] is returned. The matching clips are counted, for example, 2 times for [2, 7, 4, 9], 1 time for [2, 7, 4, 10], and 1 time for [10, 11, 11, 12]. The matching clips are sorted in reverse order according to the count. In a case that the counts are the same, sorting is performed in ascending order according to src-startTime, to obtain match-list=[[2, 7, 4, 9], [2, 7, 4, 10], [10, 11, 11, 12]] and count-list=[2, 1, 1].

Figure 19:
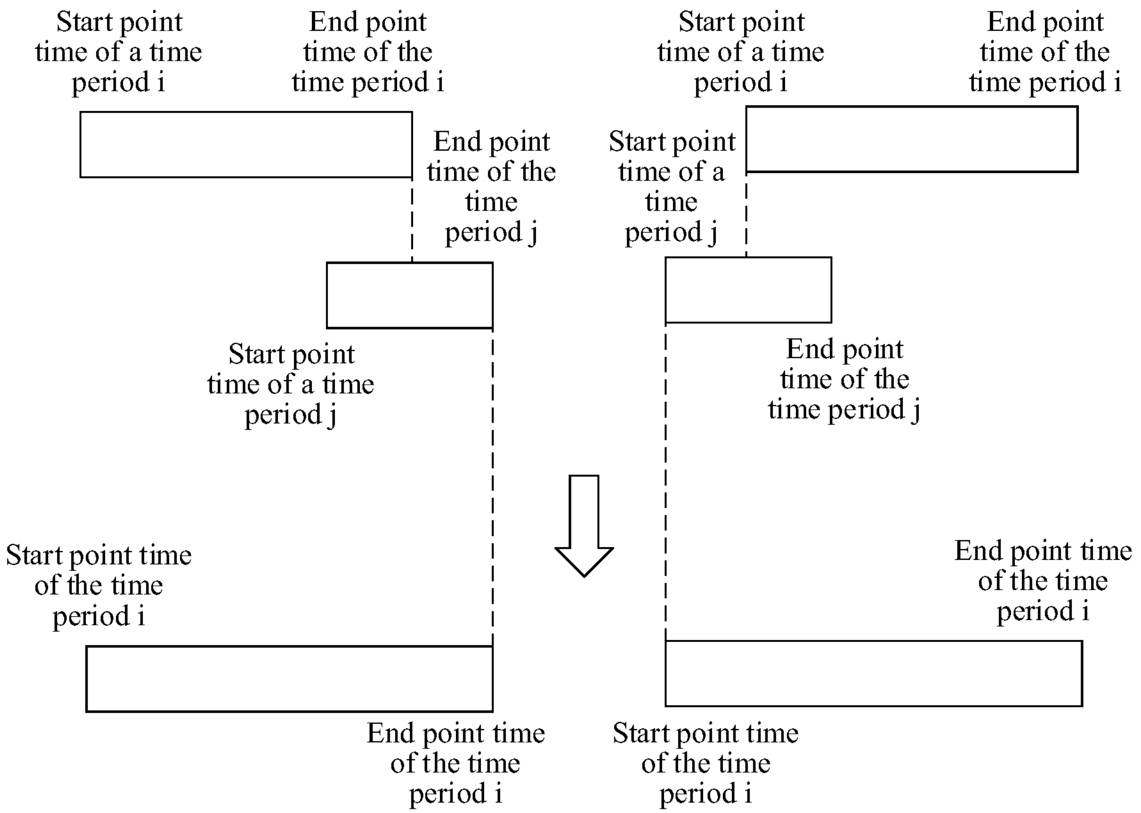
FIG. 19 is a schematic diagram of updating an overlap existing between time periods according to some embodiments.

Overlapping matching clips in the match-list are combined. In some embodiments, an effective overlap ratio T4, such as 0.5, is set, which means that in a case that a ratio of an overlapping duration between two period times accounts for a duration of a target clip is greater than T4, counts of the two time periods need to be combined and calculated. An effective matching count T5, such as 3, means that in a case that a count of a matching clip is greater than T5, the clip cannot be ignored. For the time period i in the match-list (referring to the time period formed by src-startTime and src-endTime), and the time period j=i+1 in the match-list, in a case that the time period i includes the time period j, and a duration of the period j>0.5*a duration of the period i, delete j is deleted, and a count of the period i=an original count of the period i+a count of the period j. In a case that i overlaps with j, an overlapping duration >0.5*a duration of the period i, and a count of the period j is greater than T5, a combined time of the periods i and j is the longest start-to-end time, and a count of the period i=an original count of the period i+the count of the period j. In a case that a count of the period j is less than T5, the period j is deleted, and a count of the period i=an original count of the period i+the count of the period j. That is, in this case, the period i and the period j are not combined, only the period i with the largest occurrence count is retained, but the count of the period j is reflected in the new count of the period i. In a case that i overlaps with j, and an overlapping duration <0.5*a duration of the period i, the period j is discarded. As shown in FIG. 19, in a case that a start point time of the time period i is before a start point time of the time period j, but an end point time of the time period i is before an end point time of the time period j, i overlaps with j. The end point time of the time period i needs to be updated to the end point time of the time period j. In addition, in a case that a start point time of the time period i is after a start point time of the time period j, and an end point time of the time period i is after an end point time of the time period j, i overlaps with j. The end point time of the time period i needs to be updated to the start point time of the time period j.

A new video matching clip match-list (such as [[2, 7, 4, 9], [10, 11, 11, 12]]) and a count count-list (such as [3, 1]) are obtained. An effective recurrence count ratio threshold T6 is set, which means that in mining on N video pairs, in a case that a recurrence count x of a matching video clip >N*T6, it is an effective repeated clip (such as T6=0.5). For the match-list, the effective time period is retained, match-list=[[2, 7, 4, 9]] and count=[3] are obtained. The match-list herein is a recognition result obtained by performing fixed-period sequence similarity searching through frame-level features and different list videos.

For generation of the global list, for an obtained OCR keyword, videos with the same OCR keyword are found from the global videos of the last one or two weeks, and 10,000 videos are randomly sampled from them, to form the global list. Compared with directly using all the global videos to generate a global list, videos from the same platform or in the same period, or recent videos are used, so that less videos required for comparison are mined, updating is more targeted, and it is easier to mine a newly-added platform opening or ending. In a case that there is no match for an OCR word in the keyword library, 10,000 videos are randomly sampled from the global videos in the last week as the global list. To ensure efficient generation of the global list, OCR text may be extracted from global small videos in advance and the keyword library may be queried, so that each word of the keyword library may be associated with some global small videos. The keyword library includes various keywords, and videos on the video platform are associated with the keywords in the keyword library. In addition, the global list has a same keyword as the queried video. In addition, 10,000 videos with the same keyword in combination with 10,000 videos randomly sampled globally may be used, to improve generalization performance and improve the accuracy of keyword recognition. As shown in FIG. 12, for a global newly-added video, such as a video newly uploaded by a user on the video platform, frame-level images may be extracted from the global newly-added video, and text recognition may be performed on the frame-level images. A keyword query is performed using text recognition results and various keywords in the keyword library, to conclude video information of the global newly-added video. For example, an association relationship between the global newly-added video and a corresponding keyword may be established. Video information of videos on the video platform may also be concluded and processed to obtain the global list.

For maintenance of the keyword library, since video platforms continuously emerge, new video platforms may appear, and needs to be dynamically updated and maintained. A keyword of a new video platform that may appear in an opening or ending platform logo clip may be directly added, to dynamically update and maintain the keyword library. In some embodiments, during mining in the local list, a platform keyword of the queried video is obtained, and the obtained platform keyword may be updated to the keyword library.

Figure 20:
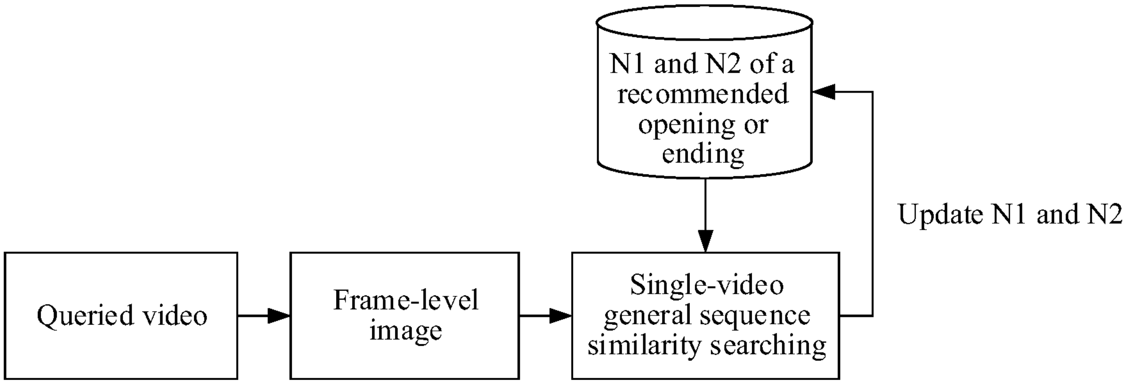
FIG. 20 is a schematic diagram of updating an opening or ending recommendation count according to some embodiments.

For recording a newly-added opening or ending to the general opening or ending library, a recommended opening or ending may be generated from an anchor point recognition result 1 or 2 in list mining and stored in the recommendation library, and an occurrence count N1 and an addition count N2 of the opening or ending are recorded in the recommendation library. As shown in FIG. 20, after an opening or an ending is obtained by performing single-video general sequence similarity searching using the frame-level image obtained from the queried video, an occurrence count N1 and an addition count N2 of the opening or ending are updated. Each time in the foregoing video list and single-video mining, whether an opening or ending in the recommendation library is included is queried. In a case that each time the opening or ending is included, that is, an opening or ending mining result obtained each time in the foregoing video list and single-video mining includes the opening or ending, an occurrence count and an addition count of the opening or ending in the recommendation library are increased, that is, N1 and N2 are updated. After T days, according to the addition count, an opening or ending with a larger addition count is selected and stored in the general opening or ending library.

In some embodiments, after a high-confidence opening or ending is mined in global list mining, the opening or ending may be configured for subsequent querying in the video global library. To ensure effectiveness of a general opening or ending library, a buffer library, that is, a recommended opening or ending library, may be used. The recommended opening or ending library is configured to store all openings or endings generated through global list mining, as well as effective information N1 and N2. N1 is an occurrence count of an opening or ending, and N2 is an addition count of occurrence of an opening or ending. For a specific opening or ending, in a case that the opening or ending is stored in the library, N1 is recorded as 1, and N2 is recorded as 0. Each time a queried video arrives, a query is performed on the recommended opening or ending library. If a specific matching opening or ending is found, a record of N2 of the opening or ending is increased by 1. After some time, assuming that a time threshold 7 days, openings or endings are sorted in descending order according to the recorded number of N2, and the top 10% openings or endings with N2>100 are taken, to obtain a final recommended opening or ending in this cycle. The final recommended opening or ending is recorded into the general opening or ending library. In a case that the opening or ending has been recorded into the general opening or ending library, all records of the recommended opening or ending library are simultaneously updated: N1=original N1+N2, N2=0. From then, collection of statistics of a next cycle is started. In addition, in a case that a video is stored in the library, in addition to N1 and N2, a time T is recorded to indicate a quantity of days the video has been stored in the library. Statistics of an opening or ending whose days of being stored in the library is a multiple of 7 are collected every day. In a case that a record of N2 of the opening is greater than a specified threshold, the opening or ending is recorded into the general library, and in addition, the record whose days of being stored in the recommended opening or ending library is a multiple of 7 is updated: N1=original N1+N2, N2=0. From then, collection of statistics of a next cycle is started. The general opening or ending library may also be updated using other threshold determination policies based on N1, N2, and T. In addition, a time periodicity of an update from the recommended opening or ending library to the global opening or ending library may be adjusted in real time, for example, according to daily video traffic statistics, an update is performed in a case that the traffic reaches a specific threshold.

A combination result is generated from the recognition result 3 and the recognition result 4, and the combination result is combined with the recognition result 1 or the recognition result 2. Because both recognition results are obtained through searching based on a plurality of video pairs, an obtained matching time period is strong opening or ending information, that is, the confidence that the time period belongs to an opening or ending is extremely high. In this case, the two recognition results need to be combined to obtain an opening or ending that occurs repeatedly between videos. In some embodiments, in a case that the combination result is combined with the recognition result 1 or the recognition result 2, opening time clips of the combination result and the recognition result 1 or the recognition result 2 are combined, and a maximum time is obtained as an opening cut-off time. For example, in a case that the opening time clips are [2, 7], [9, 15], and [9, 13], after time combination, [2, 15] is outputted as an opening time period, and 15 is a cut-off time. Likewise, for ending combination of the combination result and the recognition result 1 or the recognition result 2, a minimum time may be obtained as a start time of the ending, to obtain a comprehensive recognition result, including the opening and the ending obtained through comprehensive recognition.

The video recognition method provided in some embodiments supports recognition of openings or endings with non-equal lengths, and implements, with the help of video frame embedding similarity sequence searching, opening or ending recognition under misaligned times or openings or endings with non-equal durations. In addition, local and global list embedding mining is combined with opening or ending recognition at the user dimension and the platform dimension, to improve an overall determination effect and prevent an opening or ending that occurs at the platform dimension from being ignored in conventional mining, so that small video content can be cleaned more cleanly. In addition, for global openings or endings that are mined, closed-loop management on opening or ending mining and general openings or endings is implemented through a recommended opening or ending library, network-wide recurrence statistics, saving to an official opening and ending library, and the like. In addition to opening or ending recognition on small videos, after limited modification, the video recognition method provided in some embodiments is also applicable to other types of videos, for example, opening or ending recognition on long videos such as films and TV dramas. For example, a video list for global mining needs to be limited for long videos, to avoid comparison on excessive videos from causing increased time consumption.

Although the operations in the flowcharts involved in the foregoing embodiments are displayed sequentially according to instructions of arrows, these operations are not necessarily performed sequentially according to a sequence instructed by the arrows. Unless otherwise clearly specified in this specification, the operations are performed without any strict sequence limit, and may be performed in other sequences. In addition, at least a part of the operations involved in the foregoing embodiments may include a plurality of operations or a plurality of stages. These operations or stages are not necessarily performed and completed at the same moment, and may be performed at different moments. Besides, the operations or stages may not be necessarily performed sequentially, and may be performed in turn or alternately with other operations or at least a part of operations or stages of other operations.

Based on the same inventive concept, some embodiments further provide a video recognition apparatus for implementing the foregoing video recognition method. The implementation solutions provided by the apparatus for resolving the problems are similar to the implementation solutions described in the foregoing method. For specific limitations in one or more embodiments of the video recognition apparatus provided below, refer to the limitations on the video recognition method above. Details are not described herein again.

Figure 21:
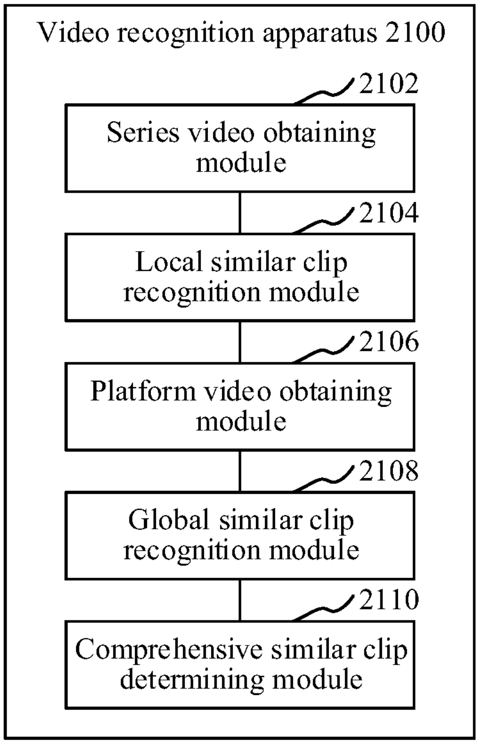
FIG. 21 is a structural block diagram of a video recognition apparatus according to some embodiments.

In some embodiments, as shown in FIG. 21, a video recognition apparatus 2100 is provided, including: a series video obtaining module 2102, a local similar clip recognition module 2104, a platform video obtaining module 2106, a global similar clip recognition module 2108, and a comprehensive similar clip determining module 2110.

The series video obtaining module 2102 is configured to obtain a target video and a series reference video in a video series, the video series including videos belonging to the same series.

The local similar clip recognition module 2104 is configured to recognize a series local similar clip in the target video relative to the series reference video according to a first matching result obtained by performing video frame matching on the target video and the series reference video.

The platform video obtaining module 2106 is configured to obtain a platform reference video from a video platform to which the target video belongs.

The global similar clip recognition module 2108 is configured to recognize a platform global similar clip in the target video relative to the platform reference video according to a second matching result obtained by performing video frame matching on the target video and the platform reference video.

The comprehensive similar clip determining module 2110 is configured to determine a comprehensive similar clip in the target video relative to the series reference video and the platform reference video based on respective positions of the series local similar clip and the platform global similar clip in the target video.

In some embodiments, a correction and update module is further included and configured to correct and update the series local similar clip according to a correction clip including a correction keyword in the target video, to obtain an updated series local similar clip. The comprehensive similar clip determining module 2110 is further configured to determine the comprehensive similar clip in the target video relative to the series reference video and the platform reference video based on a position of the updated series local similar clip and the position of the platform global similar clip in the target video.

In some embodiments, the correction and update module includes a correction clip determining module, a timestamp update module, and a similar clip update module. The correction clip determining module is configured to determine the correction clip including the correction keyword in the target video. The timestamp update module is configured to update a timestamp position of the series local similar clip in the target video according to a timestamp position of the correction clip in the target video, to obtain an updated timestamp position. The similar clip update module is configured to determine the updated series local similar clip in the target video based on the updated timestamp position.

In some embodiments, the correction clip determining module is further configured to perform text recognition on video frames in the target video, to obtain text recognition results; match the text recognition results with the correction keyword, to obtain matching results; and determine the correction clip including the correction keyword in the target video according to video frames associated with matching results indicating a successful match.

In some embodiments, the platform reference video includes a platform public video clip obtained from a public video library of the video platform to which the target video belongs and a platform associated video obtained from the video platform. The global similar clip recognition module 2108 includes a public video matching module, an associated video matching module, and a matching result processing module. The public video matching module is configured to perform video frame matching on the target video and the platform public video clip, to obtain a public video matching result. The associated video matching module is configured to perform video frame matching on the target video and the platform associated video in a case that no similar clip is recognized according to the public video matching result, to obtain an associated video matching result. The matching result processing module is configured to recognize the platform global similar clip in the target video relative to the platform associated video based on the associated video matching result.

In some embodiments, a public video update module is further included, and configured to update a recognition statistical parameter of the platform global similar clip, to obtain an updated recognition statistical parameter; and update the platform global similar clip as the platform public video clip into the public video library in a case that the updated recognition statistical parameter satisfies a platform public determination condition.

In some embodiments, the platform video obtaining module 2106 is further configured to obtain the platform public video clip from a public video library of the video platform to which the target video belongs. The global similar clip recognition module 2108 is further configured to recognize the platform global similar clip in the target video relative to the platform public video clip according to the second matching result obtained by performing video frame matching on the target video and the platform public video clip.

In some embodiments, the platform video obtaining module 2106 includes a platform determining module, an associated video query module, and a video sifting module. The platform determining module is configured to determine the video platform to which the target video belongs and a correction keyword included in video frames of the target video. The associated video query module is configured to query the video platform for platform associated videos having association relationships with the correction keyword. The video sifting module is configured to sift a platform reference video from the platform associated videos according to a reference video sifting condition.

In some embodiments, an association relationship construction module is further included, and configured to perform text recognition on video frames in a platform video belonging to the video platform, to obtain a video keyword; perform matching in a keyword library based on the video keyword, to determine a target keyword matching the video keyword; and establish an association relationship between the platform video and the target keyword. The associated video query module is further configured to query, based on the association relationships, the video platform for the platform associated videos associated with the correction keyword.

In some embodiments, the comprehensive similar clip determining module 2110 includes a timestamp determining module, a timestamp combination module, and a comprehensive timestamp processing module. The timestamp determining module is configured to determine a first timestamp position of the series local similar clip in the target video and a second timestamp position of the platform global similar clip in the target video. The timestamp combination module is configured to combine the first timestamp position with the second timestamp position, to obtain a comprehensive timestamp position. The comprehensive timestamp processing module is configured to determine the comprehensive similar clip in the target video relative to the series reference video and the platform reference video according to the comprehensive timestamp position.

In some embodiments, the local similar clip recognition module 2104 includes a series video frame matching module, a series offset determining module, and a series video frame pair processing module. The series video frame matching module is configured to perform image matching on video frames of the target video and the series reference video, to obtain video frame pairs, the video frame pairs including to-be-recognized video frames belonging to the target video and further including series reference video frames image-matching the to-be-recognized video frames in the series reference video. The series offset determining module is configured to determine time offsets of the video frame pairs based on time attributes of the to-be-recognized video frames in the video frame pairs and time attributes of the series reference video frames in the video frame pairs. The series video frame pair processing module is configured to sift video frame pairs with matching time offsets, and determine the series local similar clip in the target video relative to the series reference video based on time attributes of to-be-recognized video frames in the sifted video frame pairs.

In some embodiments, the series video frame pair processing module is further configured to perform numerical matching on the time offsets of the video frame pairs, and sift, according to numerical matching results, video frame pairs with numerically matching time offsets; determine a start time and an end time based on the time attributes of the to-be-recognized video frames in the sifted video frame pairs; and determine the series local similar clip in the target video relative to the series reference video according to the start time and the end time.

In some embodiments, the series video frame pair processing module is further configured to obtain a video frame pair list including the sifted video frame pairs; sort, in the video frame pair list, the video frame pairs in ascending order according to values of the time offsets, and sort video frame pairs with the same time offset in ascending order according to values of timestamps of to-be-recognized video frames included in the video frame pairs with the same time offset, the timestamps being determined according to time attributes of the included to-be-recognized video frames; determine, in the video frame pair list, time attribute distances between time attributes of to-be-recognized video frames in adjacent video frame pairs; determine adjacent video frame pairs whose time attribute distances do not exceed a distance threshold as video frame pairs belonging to the same video clip; and determine the start time and the end time according to timestamps of to-be-recognized video frames in the video frame pairs belonging to the same video clip.

In some embodiments, the series video frame pair processing module is further configured to determine a start video frame pair and an end video frame pair in the video frame pairs belonging to the same video clip based on the timestamps of the to-be-recognized video frames in the video frame pairs belonging to the same video clip; obtain the start time according to a timestamp of a to-be-recognized video frame in the start video frame pair; and determine the end time according to a timestamp of a to-be-recognized video frame in the end video frame pair.

In some embodiments, the series video frame pair processing module is further configured to perform numerical comparison on the time offsets of the video frame pairs respectively, to obtain numerical comparison results; sift, based on the numerical comparison results, video frame pairs having numerical differences between time offsets less than a numerical difference threshold from the video frame pairs; and perform an offset update on the video frame pairs having the numerical differences between the time offsets less than the numerical difference threshold, to obtain the video frame pairs with the numerically matching time offsets.

In some embodiments, there are at least two series reference videos. The series video frame pair processing module is further configured to sift the video frame pairs with the matching time offsets, and determine intermediate similar clips in the target video relative to the series reference videos based on the time attributes of the to-be-recognized video frames in the sifted video frame pairs; and perform, in the intermediate similar clips in the target video relative to the series reference videos, a clip update on intermediate similar clips having an overlapping relationship, to obtain the series local similar clips in the target video relative to the series reference videos.

In some embodiments, the series video frame pair processing module is further configured to perform, in the intermediate similar clips in the target video relative to the series reference videos, a clip update on intermediate similar clips having an overlapping relationship, to obtain the updated intermediate similar clips; determine statistics of the updated intermediate similar clips; and obtain, in a case that the statistics of the updated intermediate similar clip exceed a statistic threshold, the series local similar clip in the target video relative to the series reference videos according to the updated intermediate similar clips.

In some embodiments, the series video frame pair processing module is further configured to perform clip position comparison on the intermediate similar clips in the target video relative to the series reference videos, to obtain clip comparison results; determine intermediate similar clips whose clip comparison results are having an overlapping relationship; and perform, in the intermediate similar clips in the target video relative to the series reference videos, a clip update on the intermediate similar clips having an overlapping relationship according to overlapping durations and statistics of the intermediate similar clips having an overlapping relationship, to obtain the series local similar clips in the target video relative to the series reference videos.

In some embodiments, the series video frame pair processing module is further configured to obtain a similar clip list formed by the intermediate similar clips in the target video relative to the series reference videos; sort, in the similar clip list, the intermediate similar clips in descending order according to statistics, and sort intermediate similar clips with the same statistics in chronological order according to start times; and perform clip position comparison on the intermediate similar clips in the similar clip list, to obtain clip comparison results.

In some embodiments, the series video frame matching module is further configured to extract to-be-recognized video frames from the target video and extract series reference video frames from the series reference video; extract respectively video frame features from the to-be-recognized video frames and video frame features from the series reference video frames; and perform feature matching on the video frame features of the to-be-recognized video frames and the video frame features of the series reference video frames, and obtain the video frame pairs according to to-be-recognized video frames and series reference video frames that are successfully feature-matched.

In some embodiments, the series video frame matching module is further configured to extract respectively video frame features from the to-be-recognized video frames and video frame features from the series reference video frames through an image processing model. Training of the image processing model includes the following operations: obtaining a training sample image carrying a classification label; performing feature extraction and image classification on the training sample image through a to-be-trained image processing model, to obtain a sample image feature and a sample image category of the training sample image; determining a model loss based on the sample image feature, the sample image category, and the classification label; and continuing training after updating the to-be-trained image processing model based on the model loss, to obtain a trained image processing model when completing the training.

In some embodiments, the global similar clip recognition module 2108 includes a global video frame matching module, a global offset determining module, and a global video frame pair processing module. The global video frame matching module is configured to perform image matching on video frames of the target video and the platform reference video, to obtain video frame pairs, the video frame pairs including to-be-recognized video frames belonging to the target video and further including platform reference video frames image-matching the to-be-recognized video frames in the platform reference video. The global offset determining module is configured to determine time offsets of the video frame pairs based on time attributes of the to-be-recognized video frames in the video frame pairs and time attributes of the series reference video frames in the video frame pairs. The global video frame pair processing module is configured to sift video frame pairs with matching time offsets, and determine the platform global similar clip in the target video relative to the platform reference video based on time attributes of to-be-recognized video frames in the sifted video frame pairs.

In some embodiments, a series recognition and update module is configured to determine a clip overlapping relationship between series local similar clips based on respective start times and end times of the series local similar clips; and perform a clip update on the series local similar clips based on the clip overlapping relationship, to obtain updated series local similar clips in the target video relative to the series reference video.

In some embodiments, a public video determination module is further included, and configured to obtain, according to the comprehensive similar clip in a case that the comprehensive similar clip satisfies a determination condition for a public video type, a public video matching the public video type in the target video.

In some embodiments, the public video determination module is further configured to determine a public video distribution range associated the public video type of the target video; and obtain, in a case that a time period of the comprehensive similar clip is in the public video distribution range, the public video matching the public video type in the target video according to the comprehensive similar clip.

In some embodiments, a video comparison module is configured to determine a start time and an end time of the public video; extract a non-public video from the target video according to the start time and the end time when a video comparison trigger event occurs; and perform video comparison between the non-public video and a to-be-compared video.

In some embodiments, a video playback skipping module is further included, and configured to determine a skip time point of the public video; play the target video when a video playback event for the target video occurs; and perform playback by skipping the public video in a case that a playback progress of the target video reaches the skip time point.

Each module in the video recognition apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 22:
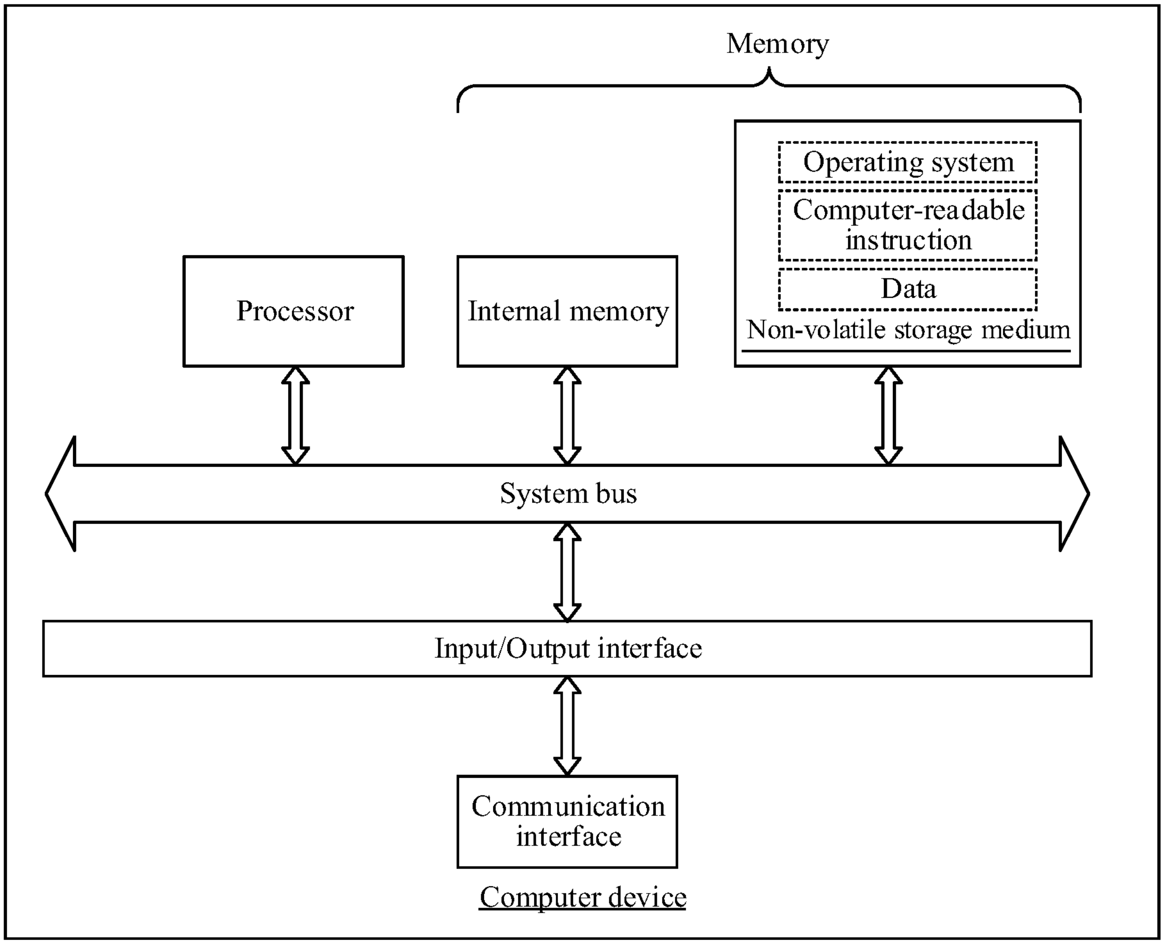
FIG. 22 is a diagram of an internal structure of a computer device according to some embodiments.

In some embodiments, a computer device is provided. The computer device may be a server or a terminal, and an internal structure diagram thereof may be shown in FIG. 22. The computer device includes a processor, a memory, an input/output interface (I/O), and a communication interface. The processor, the memory, and the input/output interface are connected by a system bus, and the communication interface is connected to the system bus by the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store video recognition data. The input/output interface of the computer device is configured to exchange information between the processor and an external device. The communication interface of the computer device is configured to communicate with an external terminal through a network connection. The computer-readable instructions, when executed by the processor, implement a video recognition method. A person skilled in the art may understand that, the structure shown in FIG. 22 is only a block diagram of a part of a structure related to a solution of some embodiments and does not limit the computer device to which the solution of some embodiments is applied. In some embodiments, the computer device may include more or fewer members than those in the drawings, or include a combination of some members, or include different member layouts.

In some embodiments, a computer device is provided, including a memory and a processor. The memory has computer-readable instructions stored therein. The processor, when executing the computer-readable instructions, implements the operations in the various method embodiments.

In some embodiments, a computer-readable storage medium is provided, having computer-readable instructions stored therein. The computer-readable instructions, when executed by a processor, implement the operations in the various method embodiments.

In some embodiments, a computer program product is provided, including computer-readable instructions. The computer-readable instructions, when executed by a processor, implement the operations in the various method embodiments.

User information (including, but not limited to, user equipment information, personal information of a user, and the like) and data (including but is not limited to data for analysis, stored data, and displayed data) involved in some embodiments are both information and data authorized by the user or fully authorized by all parties. In addition, the collection, use, and processing of relevant data need to comply with relevant laws, regulations, and standards of relevant countries and regions. In addition, for the platform promotion information involved in some embodiments, users may refuse or conveniently refuse advertisement push information and the like.

A person of ordinary skill in the art may understand that all or some of the procedures of the methods of various embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a database, or another medium used in embodiments may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random-access memory (ReRAM), a magnetoresistive random-access memory (MRAM), a ferroelectric random-access memory (FRAM), a phase change memory (PCM), a graphene memory, and the like. The volatile memory may include a random access memory (RAM), an external cache, or the like. For the purpose of description instead of limitation, the RAM is available in a plurality of forms, such as a static RAM (SRAM) or a dynamic RAM (DRAM). The database involved in various embodiments may include at least one of a relational database and a non-relational database. The non-relational database may include a blockchain-based distributed database and the like, but is not limited thereto. The processor involved in some embodiments may be a general-purpose processor, a central processing unit, a graphics processing unit, a digital signal processor, a programmable logic device, a quantum computing-based data processing logic device, and the like, but is not limited thereto.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video recognition method, performed by a computer device, comprising:

obtaining a target video and a series reference video in a video series, the video series comprising videos belonging to a same series;

recognizing a series local similar clip in the target video relative to the series reference video according to a first matching result obtained by performing video frame matching on the target video and the series reference video;

obtaining a platform reference video from a video platform to which the target video belongs;

recognizing a platform global similar clip in the target video relative to the platform reference video according to a second matching result obtained by performing video frame matching on the target video and the platform reference video;

updating the series local similar clip based on a correction clip comprising a correction keyword in the target video; and determining a comprehensive similar clip in the target video relative to the series reference video and the platform reference video based on respective positions of the series local similar clip and the platform global similar clip in the target video.

2. The video recognition method according to claim 1, wherein the updating the series local similar clip comprises:

determining the correction clip comprising the correction keyword in the target video;

updating a timestamp position of the series local similar clip in the target video according to a timestamp position of the correction clip in the target video; and updating the series local similar clip in the target video based on the updated timestamp position.

3. The video recognition method according to claim 2, wherein determining the correction clip comprising the correction keyword in the target video comprises:

performing text recognition on video frames in the target video to obtain text recognition results;

matching the text recognition results with the correction keyword to obtain matching results; and determining the correction clip comprising the correction keyword in the target video according to the video frames associated with the matching results indicating a successful match.

4. The video recognition method according to claim 1, wherein the platform reference video comprises a platform public video clip obtained from a public video library of the video platform to which the target video belongs and a platform associated video obtained from the video platform; and the recognizing the platform global similar clip comprises:

performing video frame matching on the target video and the platform public video clip to obtain a public video matching result;

performing video frame matching on the target video and the platform associated video based no similar clip being recognized according to the public video matching result to obtain an associated video matching result; and recognizing the platform global similar clip in the target video relative to the platform associated video based on the associated video matching result.

5. The video recognition method according to claim 4, wherein the video recognition method further comprises:

updating a recognition statistical parameter of the platform global similar clip to obtain an updated recognition statistical parameter; and updating the platform global similar clip, as the platform public video clip, into the public video library based on the updated recognition statistical parameter satisfying a platform public determination condition.

6. The video recognition method according to claim 1, wherein obtaining the platform reference video from the video platform comprises:

obtaining a platform public video clip from a public video library of the video platform to which the target video belongs; and wherein recognizing the platform global similar clip in the target video relative to the platform reference video comprises:

recognizing the platform global similar clip in the target video relative to the platform public video clip according to a public video matching result obtained by performing video frame matching on the target video and the platform public video clip.

7. The video recognition method according to claim 1, wherein obtaining the platform reference video from the video platform to which the target video belongs comprises:

determining the video platform to which the target video belongs and the correction keyword comprised in video frames of the target video;

querying the video platform for platform associated videos having association relationships with the correction keyword; and selecting the platform reference video from the platform associated videos according to a reference video selecting condition.

8. The video recognition method according to claim 7, wherein the video recognition method further comprises:

performing text recognition on video frames in a platform video belonging to the video platform to obtain a video keyword;

performing matching in a keyword library based on the video keyword to determine a target keyword that matches the video keyword; and establishing an association relationship between the platform video and the target keyword; and wherein querying the video platform comprises:

querying, based on the association relationship, the video platform for the platform associated videos associated with the correction keyword.

9. The video recognition method according to claim 1, wherein determining the comprehensive similar clip comprises:

determining a timestamp position of the series local similar clip in the target video and a timestamp position of the platform global similar clip in the target video;

combining the timestamp position of the series local similar clip with the timestamp position of the platform global similar clip to obtain a comprehensive timestamp position; and determining the comprehensive similar clip in the target video relative to the series reference video and the platform reference video according to the comprehensive timestamp position.

10. The video recognition method according to claim 1, wherein recognizing the series local similar clip in the target video relative to the series reference video comprises:

performing image matching on video frames of the target video and the series reference video to obtain video frame pairs, the video frame pairs comprising to-be-recognized video frames belonging to the target video and series reference video frames matching the to-be-recognized video frames in the series reference video;

determining time offsets of the video frame pairs based on time attributes of the to-be-recognized video frames in the video frame pairs and time attributes of the series reference video frames in the video frame pairs; and selecting video frame pairs with matching time offsets and determining the series local similar clip in the target video relative to the series reference video based on the time attributes of the to-be-recognized video frames in the selected video frame pairs.

11. The video recognition method according to claim 10, wherein selecting the video frame pairs comprises:

performing numerical matching on the time offsets of the video frame pairs, and selecting, according to numerical matching results, video frame pairs with numerically matching time offsets;

determining a start time and an end time based on the time attributes of the to-be-recognized video frames in the selected video frame pairs; and determining the series local similar clip in the target video relative to the series reference video according to the start time and the end time.

12. The video recognition method according to claim 11, wherein performing the numerical matching on the time offsets of the video frame pairs, and selecting, according to the numerical matching results, the video frame pairs with the numerically matching time offsets comprises:

performing numerical comparison on the time offsets of the video frame pairs respectively, to obtain numerical comparison results;

selecting, based on the numerical comparison results, video frame pairs having numerical differences between the time offsets less than a numerical difference threshold; and performing an offset update on the video frame pairs having the numerical differences between the time offsets less than the numerical difference threshold to obtain the video frame pairs with the numerically matching time offsets.

13. The video recognition method according to claim 10, wherein there are at least two series reference videos; and wherein the selecting video frame pairs with the matching time offsets, and determining the series local similar clip in the target video relative to the series reference video based on the time attributes of the to-be-recognized video frames in the selected video frame pairs comprises:

selecting the video frame pairs with the matching time offsets, and determining intermediate similar clips in the target video relative to the at least two series reference videos based on the time attributes of the to-be-recognized video frames in the selected video frame pairs; and performing, in the intermediate similar clips in the target video relative to the at least two series reference videos, a clip update on the intermediate similar clips having an overlapping relationship to obtain the series local similar clip in the target video relative to each of the at least two series reference videos.

14. The video recognition method according to claim 13, wherein performing the clip update on the intermediate similar clips comprises:

performing clip position comparison on the intermediate similar clips in the target video relative to the at least two series reference videos to obtain clip comparison results;

determining the intermediate similar clips with the clip comparison results that have an overlapping relationship; and performing, in the intermediate similar clips in the target video relative to the at least two series reference videos, the clip update on the intermediate similar clips having an overlapping relationship according to overlapping durations and statistics of the intermediate similar clips having an overlapping relationship, to obtain the series local similar clip in the target video relative to each of the at least two series reference videos.

15. The video recognition method according to claim 10, wherein performing the image matching on the video frames of the target video and the series reference video comprises:

extracting the to-be-recognized video frames from the target video and extracting the series reference video frames from the series reference video;

extracting respectively video frame features from the to-be-recognized video frames and video frame features from the series reference video frames; and performing feature matching on the video frame features of the to-be-recognized video frames and the video frame features of the series reference video frames, and obtaining the video frame pairs according to the to-be-recognized video frames and the series reference video frames that are successfully feature-matched.

16. The video recognition method according to claim 1, wherein recognizing the platform global similar clip in the target video relative to the platform reference video comprises:

performing image matching on video frames of the target video and the platform reference video to obtain video frame pairs, the video frame pairs comprising to-be-recognized video frames belonging to the target video and platform reference video frames image-matching the to-be-recognized video frames in the platform reference video;

determining time offsets of the video frame pairs based on time attributes of the to-be-recognized video frames in the video frame pairs and time attributes of the platform reference video frames in the video frame pairs; and selecting video frame pairs with matching time offsets, and determining the platform global similar clip in the target video relative to the platform reference video based on time attributes of to-be-recognized video frames in the selected video frame pairs.

17. A video recognition apparatus comprising:

at least one memory configured to store program code; and at least one processor configured to read the program code and operate as instructed by the program code, the program code comprising:

first obtaining code configured to cause at least one of the at least one processor to obtain a target video and a series reference video in a video series, the video series comprising videos belonging to a same series;

first recognition code configured to cause at least one of the at least one processor to recognize a series local similar clip in the target video relative to the series reference video according to a first matching result obtained by performing video frame matching on the target video and the series reference video;

second obtaining code configured to cause at least one of the at least one processor to obtain a platform reference video from a video platform to which the target video belongs;

second recognition code configured to cause at least one of the at least one processor to recognize a platform global similar clip in the target video relative to the platform reference video according to a second matching result obtained by performing video frame matching on the target video and the platform reference video;

correction code configured to cause at least one of the at least one processor to update the series local similar clip based on a correction keyword in the target video; and determining code configured to cause at least one of the at least one processor to determine a comprehensive similar clip in the target video relative to the series reference video and the platform reference video based on respective positions of the series local similar clip and the platform global similar clip in the target video.

18. A non-transitory computer-readable storage medium storing computer code which, when executed by at least one processor, causes the at least one processor to at least:

obtain a target video and a series reference video in a video series, the video series comprising videos belonging to a same series;

recognize a series local similar clip in the target video relative to the series reference video according to a first matching result obtained by performing video frame matching on the target video and the series reference video;

obtain a platform reference video from a video platform to which the target video belongs;

recognize a platform global similar clip in the target video relative to the platform reference video according to a second matching result obtained by performing video frame matching on the target video and the platform reference video;

update the series local similar clin based on a correction keyword in the target video; and determine a comprehensive similar clip in the target video relative to the series reference video and the platform reference video based on respective positions of the series local similar clip and the platform global similar clip in the target video.

* * * * *